(12) United States Patent
Goi

(10) Patent No.: US 10,223,064 B2
(45) Date of Patent: Mar. 5, 2019

(54) METHOD FOR PROVIDING VIRTUAL SPACE, PROGRAM AND APPARATUS THEREFOR

(71) Applicant: COLOPL, Inc., Tokyo (JP)

(72) Inventor: Tomohisa Goi, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/851,229

(22) Filed: Dec. 21, 2017

(65) Prior Publication Data

US 2018/0181367 A1 Jun. 28, 2018

(30) Foreign Application Priority Data

Dec. 22, 2016 (JP) ................................ 2016-249633

(51) Int. Cl.
| | | |
|---|---|---|
| *G06F 3/16* | (2006.01) | |
| *G06F 3/01* | (2006.01) | |
| *G06F 3/0346* | (2013.01) | |
| *A63F 13/25* | (2014.01) | |

(52) U.S. Cl.
CPC .............. *G06F 3/165* (2013.01); *A63F 13/25* (2014.09); *G06F 3/012* (2013.01); *G06F 3/0346* (2013.01); *A63F 2250/497* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,999,185 A | * | 12/1999 | Kato | ...................... G06F 3/011 345/420 |
| 6,572,475 B1 | * | 6/2003 | Okabe | ..................... A63F 13/10 463/30 |
| 2010/0022305 A1 | | 1/2010 | Yano | |
| 2012/0119988 A1 | | 5/2012 | Izumi | |
| 2015/0352437 A1 | * | 12/2015 | Koseki | .................. A63F 13/212 463/31 |

FOREIGN PATENT DOCUMENTS

| | | |
|---|---|---|
| JP | 5-282279 A | 10/1993 |
| JP | 2005-218706 A | 8/2005 |
| JP | 2007-156642 A | 6/2007 |
| JP | 2010-22646 A | 2/2010 |
| JP | 2011-39844 A | 2/2011 |

OTHER PUBLICATIONS

Office Action in JP Application No. 2016-249633, dated Aug. 8, 2017, 8pp.
Notice of Allowance in JP Application No. 2016-249633, dated Oct. 17, 2017, 5pp.

* cited by examiner

*Primary Examiner* — Hong Zhou
(74) *Attorney, Agent, or Firm* — Hauptman Ham, LLP

(57) ABSTRACT

In at least one embodiment of this disclosure, footfalls are output at intervals of a time Ta in accordance with input for movement of a user A in the virtual space. Footfalls are output at intervals of a time Tb in accordance with input for movement of the user B in the virtual space. The computer updates the field-of-view image displayed on a head-mounted device, and further, outputs footfalls at intervals of time that is based on setting of the physical size of the user of the head-mounted device.

9 Claims, 24 Drawing Sheets

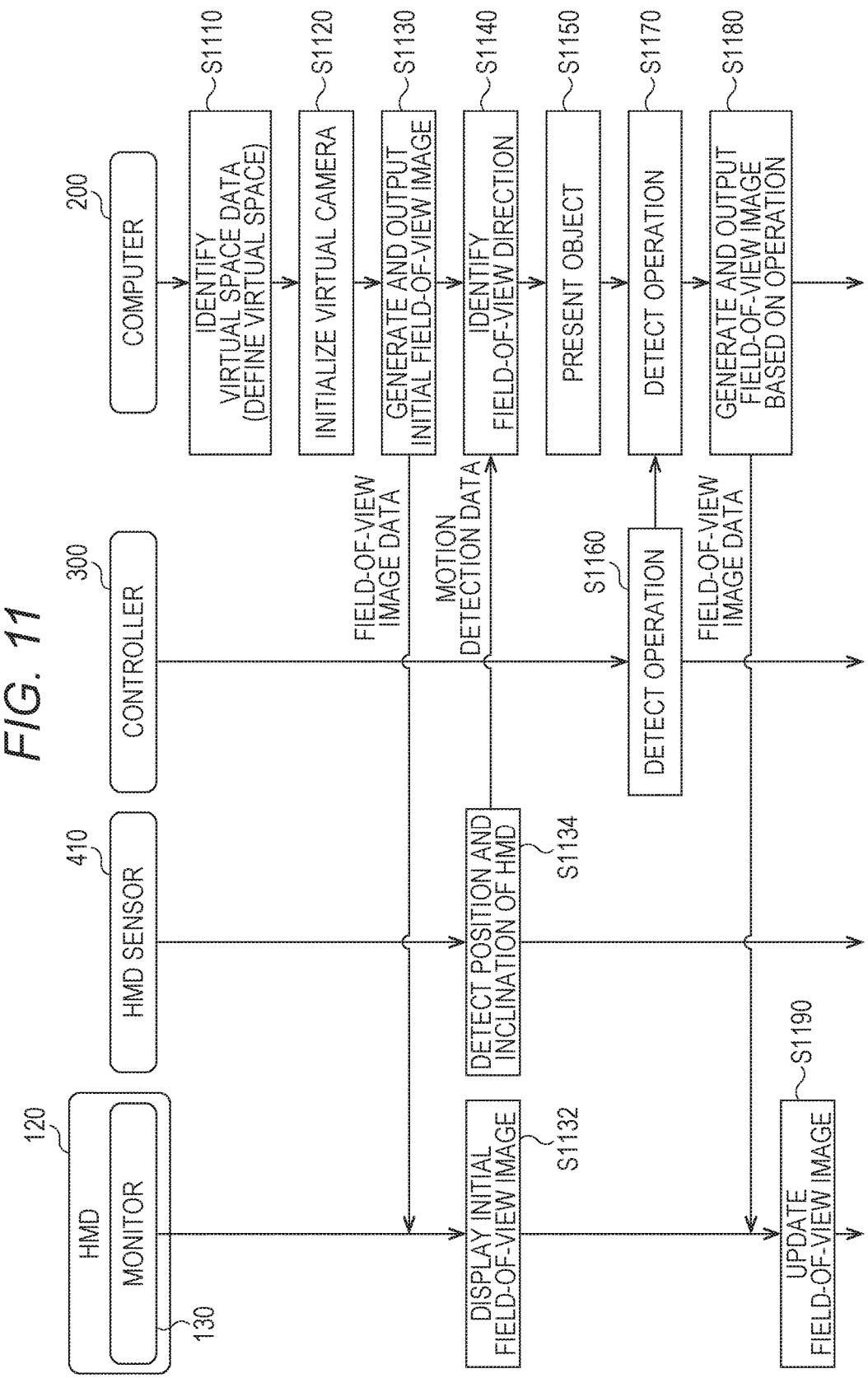

METHOD FOR PROVIDING VIRTUAL SPACE, PROGRAM AND APPARATUS THEREFOR

RELATED APPLICATIONS

The present application claims priority to Japanese Patent Application No. 2016-249633 filed Dec. 22, 2016, the disclosure of which is hereby incorporated by reference herein in its entirety.

TECHNICAL FIELD

This disclosure relates to a technology of providing a virtual space, and more particularly, to a technology of reducing sickness due to the provided virtual space.

BACKGROUND

There is known a technology of providing a virtual space through use of a head-mounted device. Further, there are described various kinds of technologies for changing the provided virtual space depending on input by a user.

PATENT DOCUMENTS

[Patent Document 1] JP 2011-39844 A

SUMMARY

According to at least one embodiment of this disclosure, there is provided a method. The method includes defining a virtual space, the virtual space including a virtual point of view. The method further includes identifying information on a physical size of a user wearing a head-mounted device (HMD). The method further includes identifying a field of view in the virtual space based on motion of the HMD and a position of the virtual point of view. The method further includes displaying, on the HMD, a field-of-view image that corresponds to the field of view. The method further includes moving the virtual point of view based on input from the user. The method further includes updating the field-of-view image based on movement of the virtual point of view. The method further includes identifying sound to be produced in the virtual space in accordance with movement of the virtual point of view. The method further includes identifying a timing to output the sound based on the physical size. The method further includes and outputting the sound from the HMD in synchronization with the timing.

BRIEF DESCRIPTION OF THE DRAWINGS

FIG. 11 A sequence chart of processing to be executed by a system including an HMD set according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
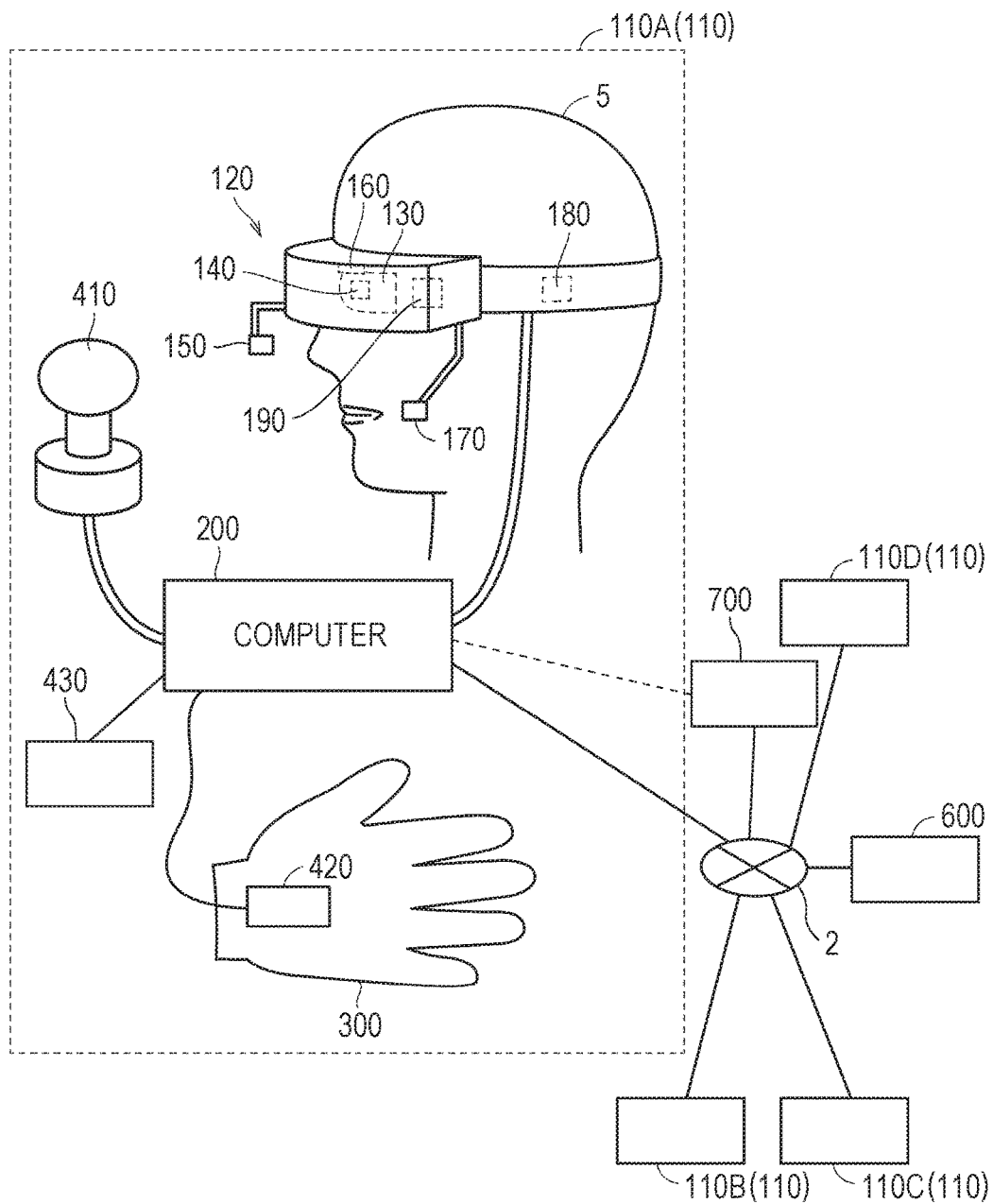
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
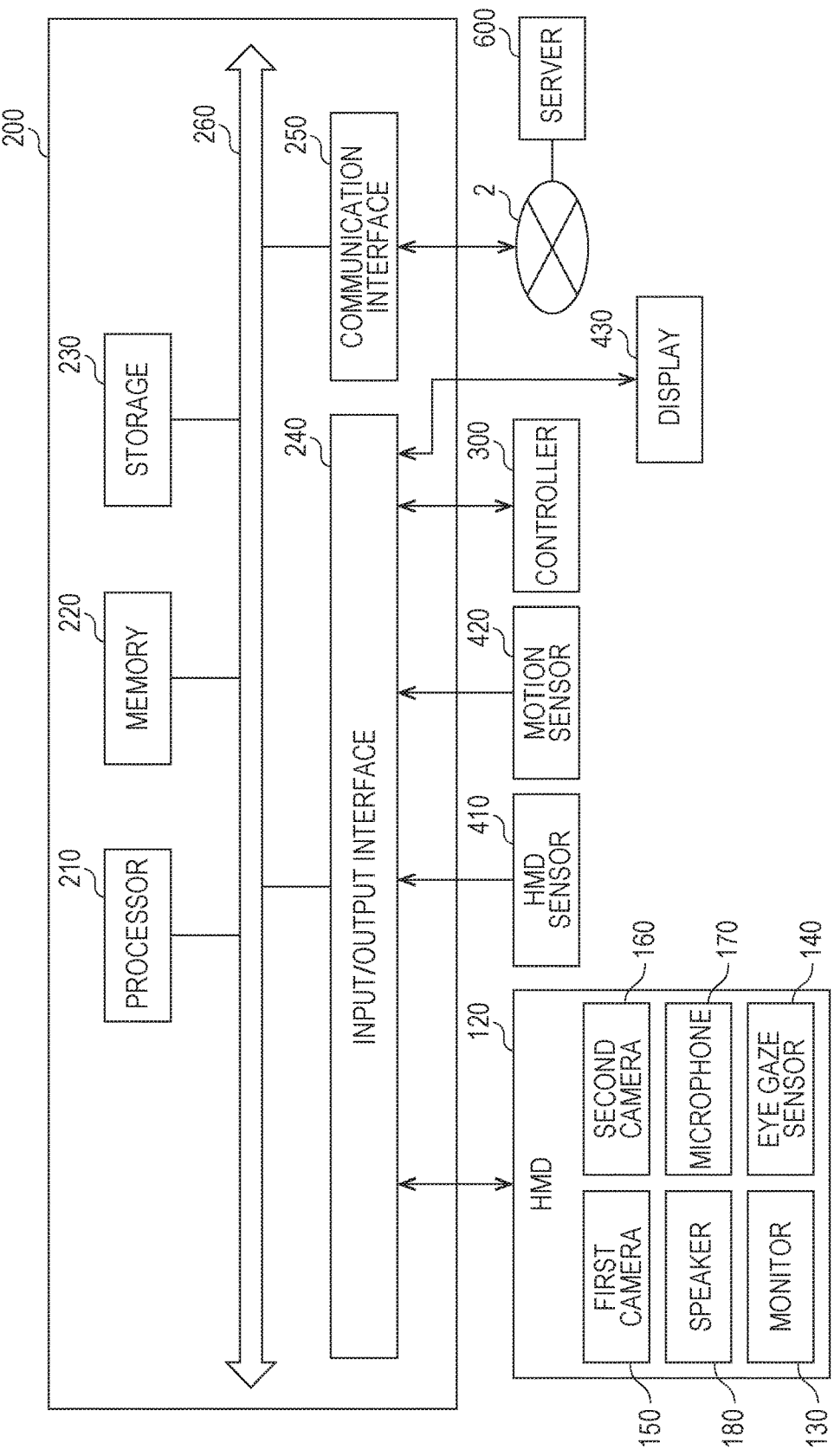
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes anyone of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
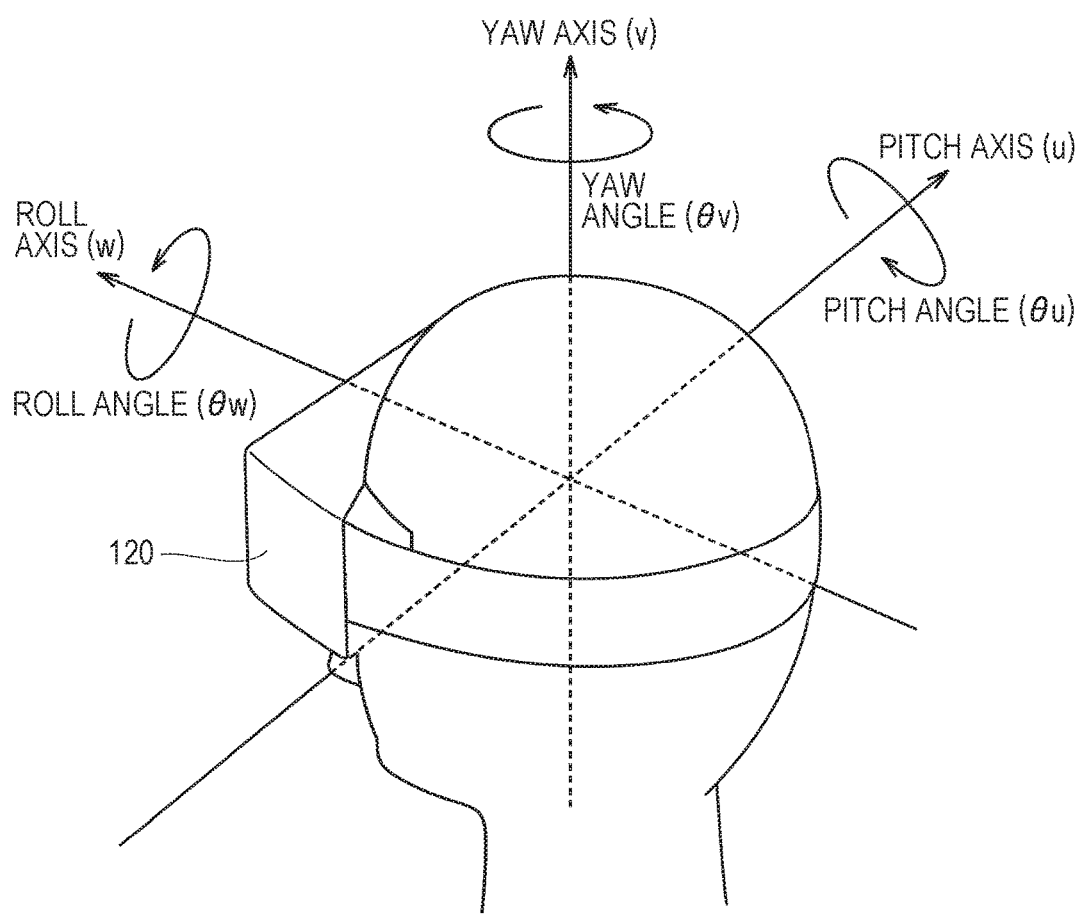
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
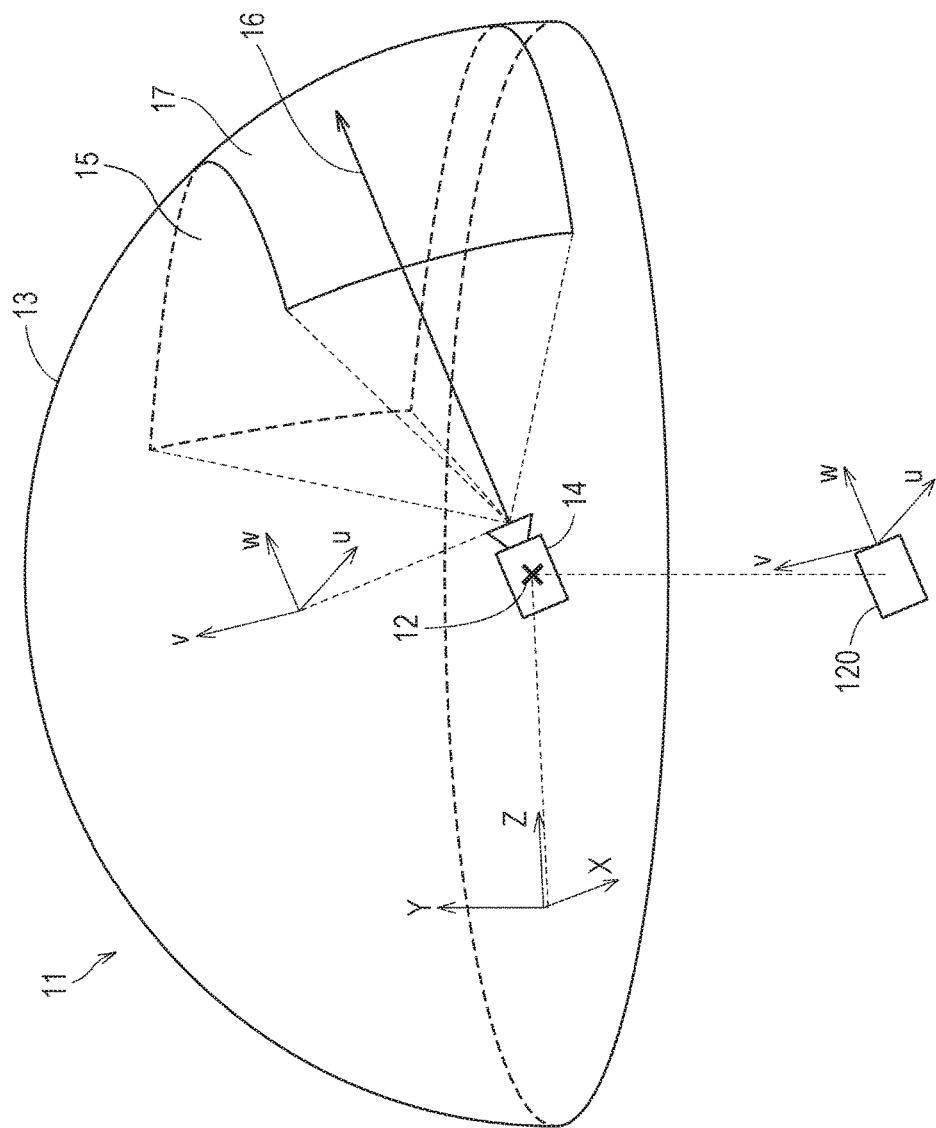
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
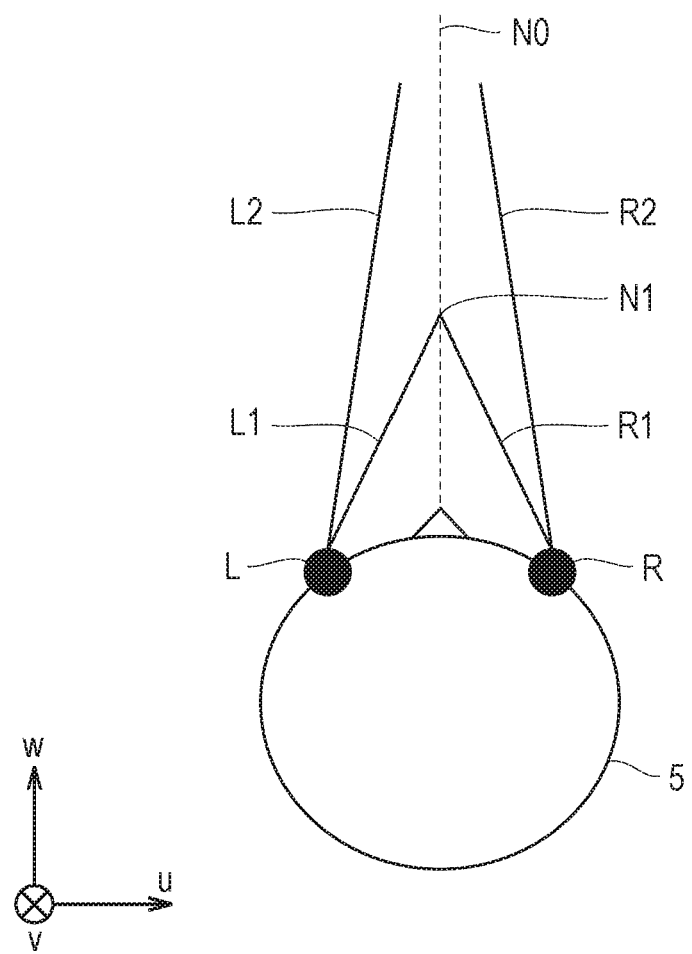
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-Of-View Region]

Figure 6:
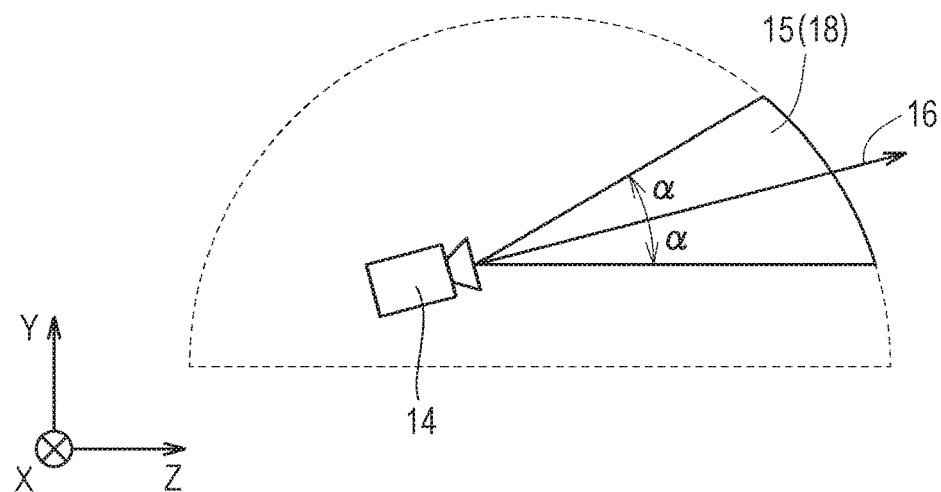
FIG. 6 A diagram of a YZ cross section obtained by viewing a field-of-view region from an X direction in the virtual space according to at least one embodiment of this disclosure.
Figure 7:
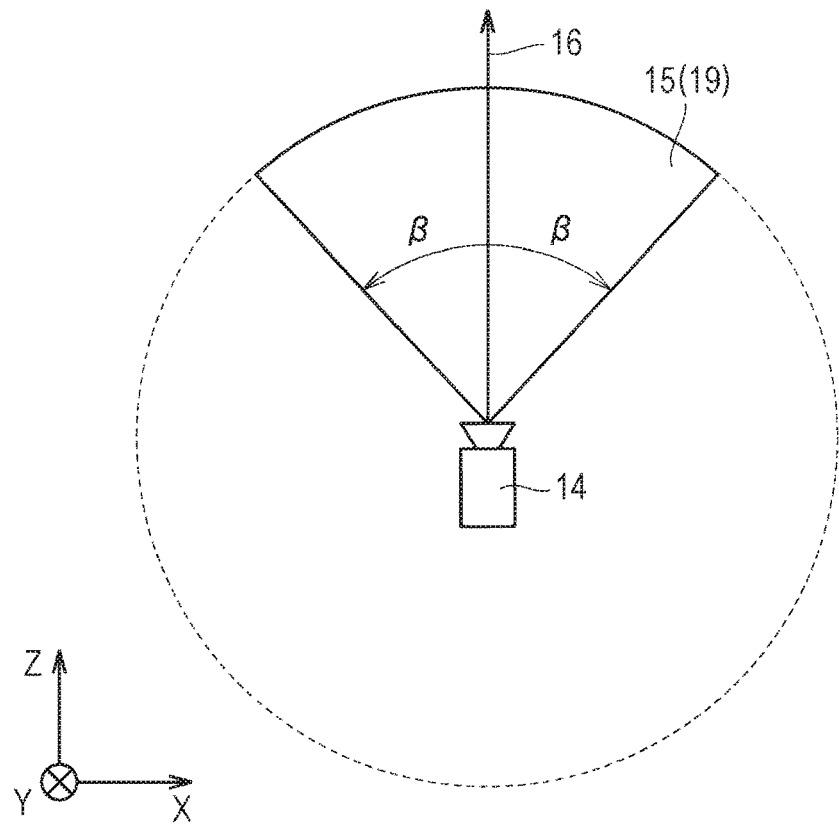
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
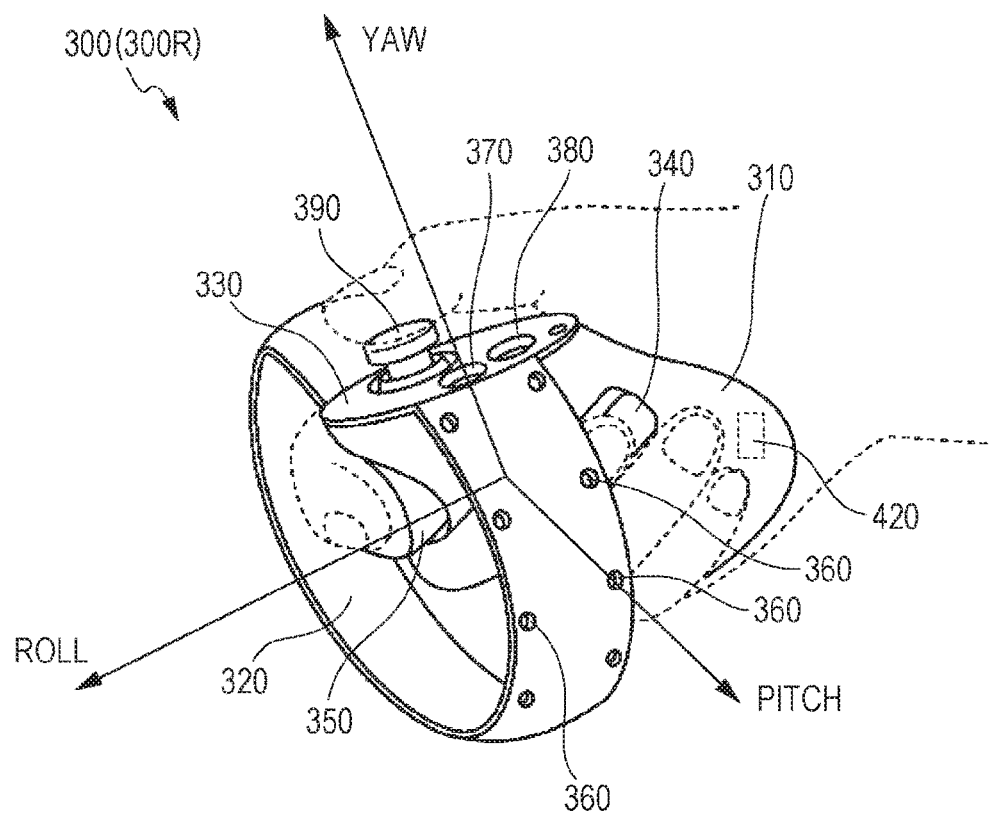
FIG. 8A A diagram of a schematic configuration of a controller according to at least one embodiment of this disclosure.
Figure 8B:
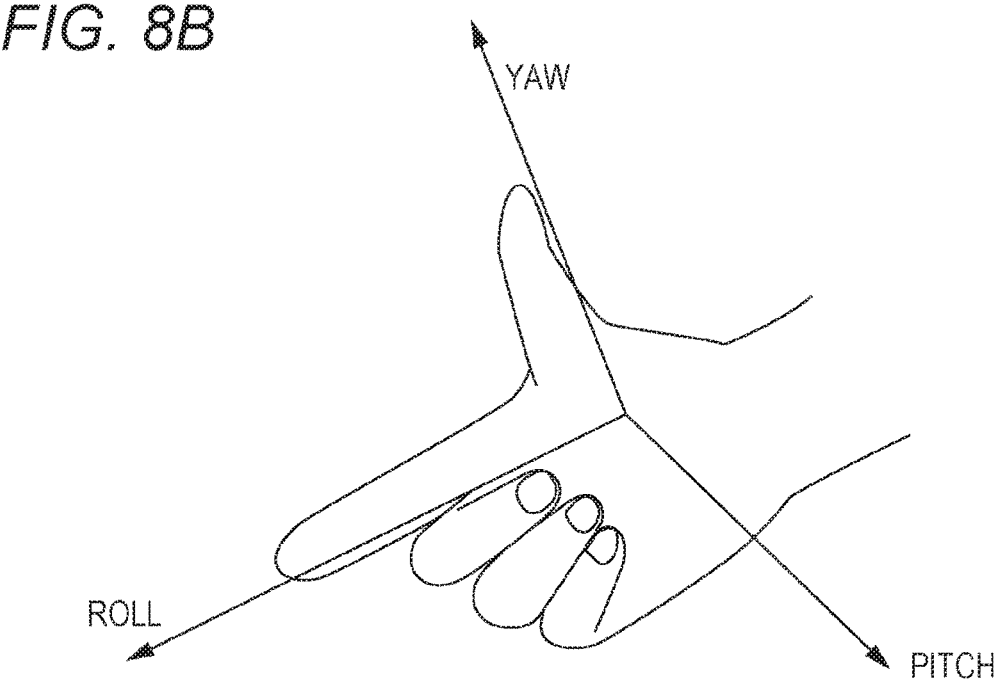
FIG. 8B A diagram of an example of a yaw direction, a roll direction, and a pitch direction that are defined with respect to a right hand of the user according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity.

The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane defined by the yaw-direction axis and the roll-direction axis when the user 5 extends his or her thumb and index finger is defined as the pitch direction.

[Hardware Configuration of Server]

Figure 9:
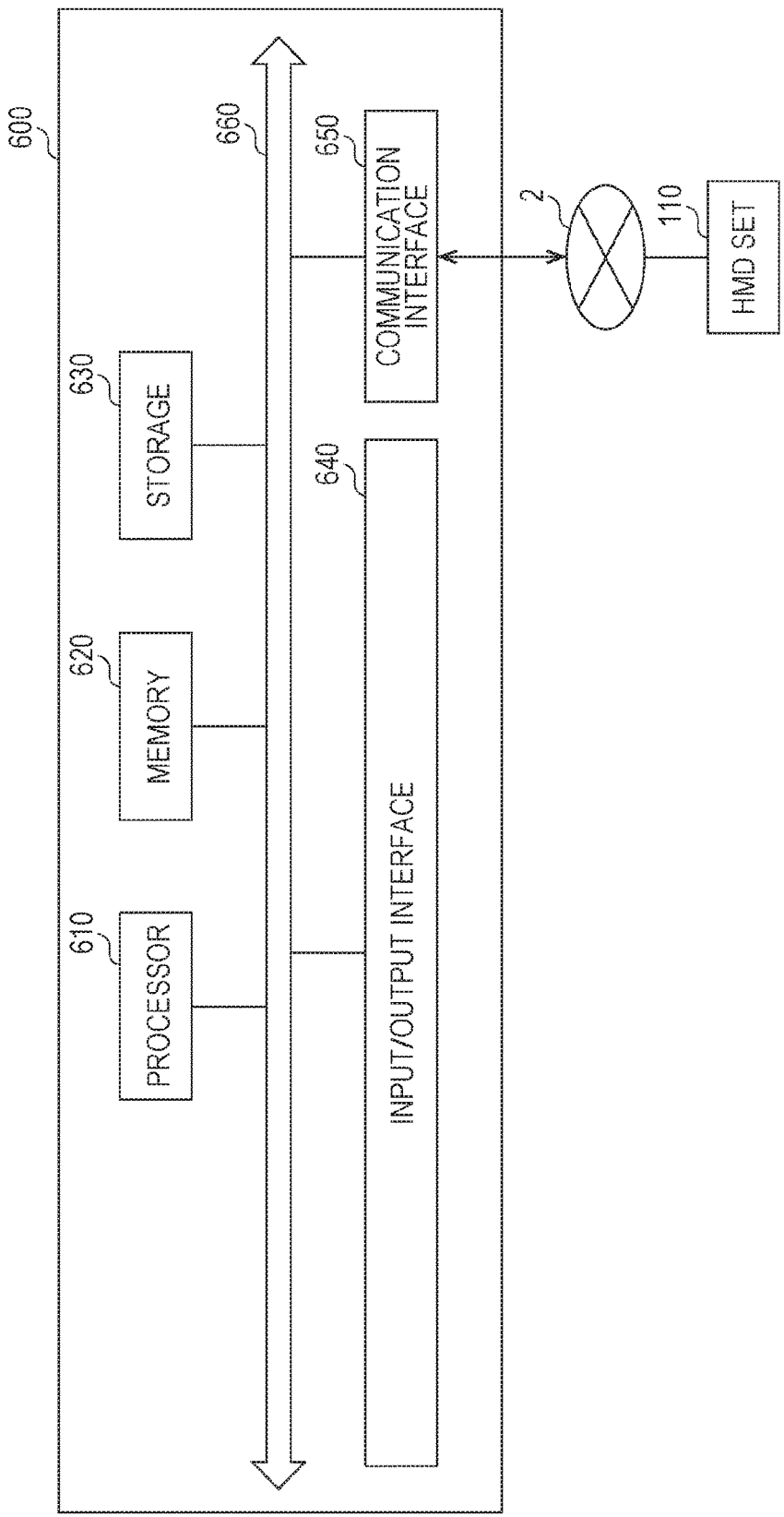
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces.

The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
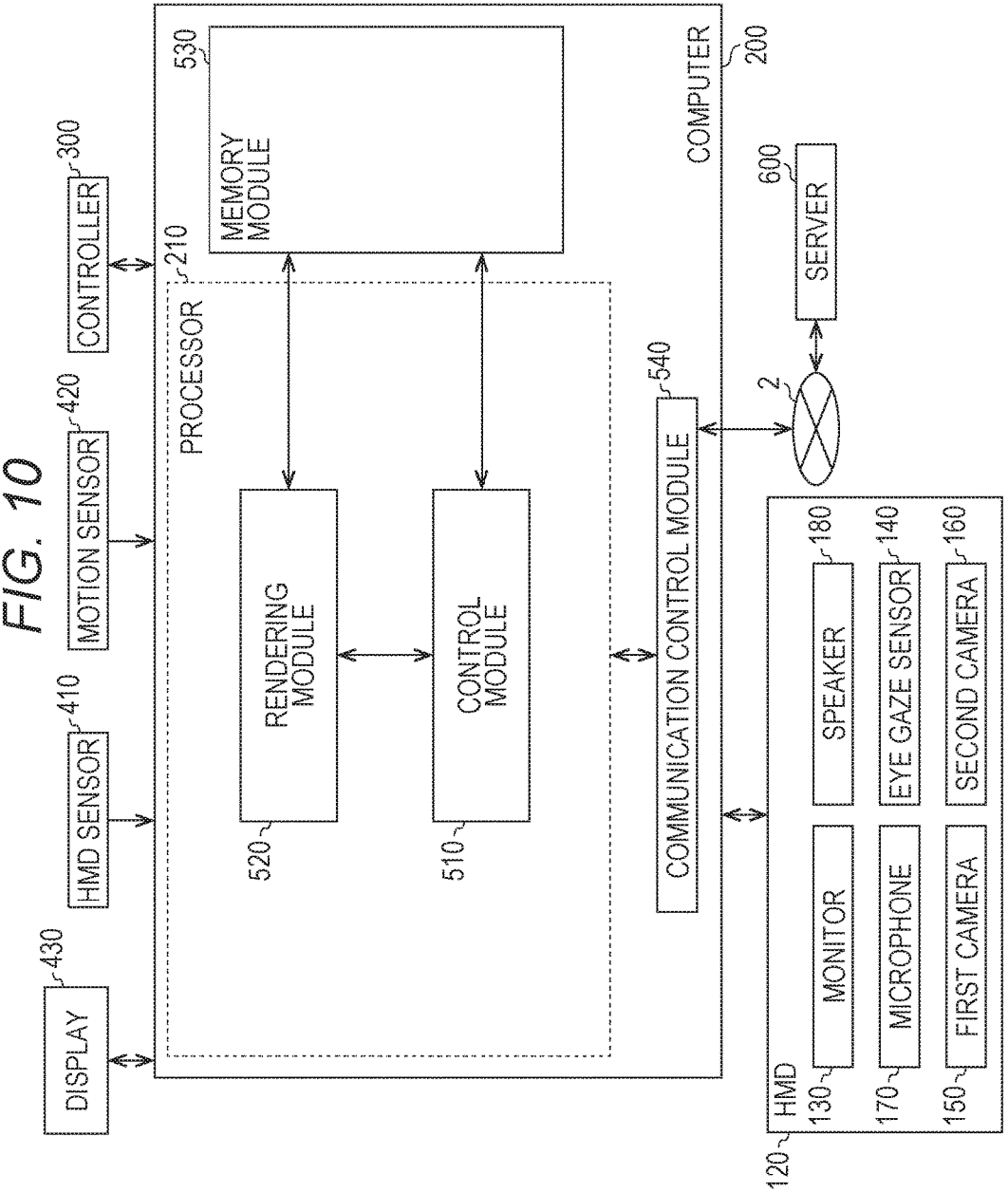
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
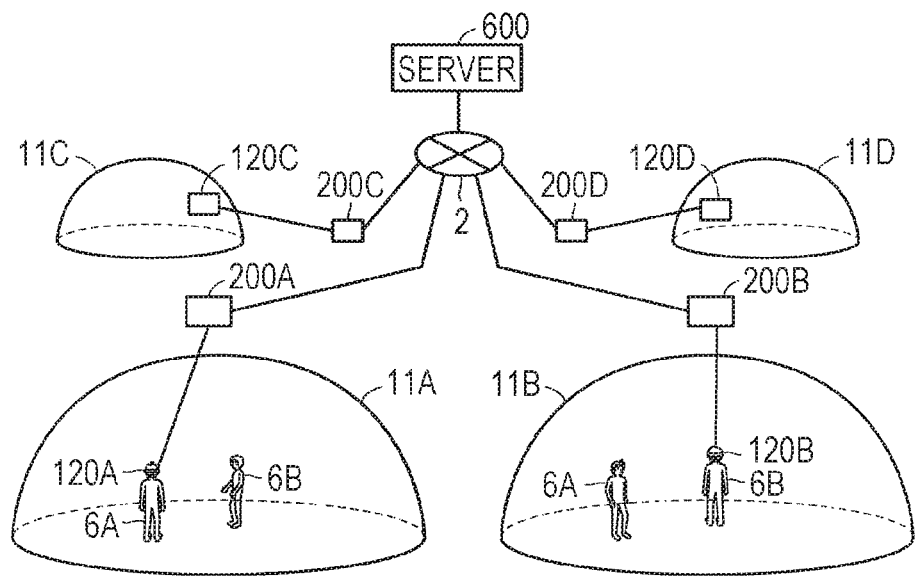
FIG. 12A A schematic diagram of HMD systems of several users sharing the virtual space interact using a network according to at least one embodiment of this disclosure.
Figure 12B:
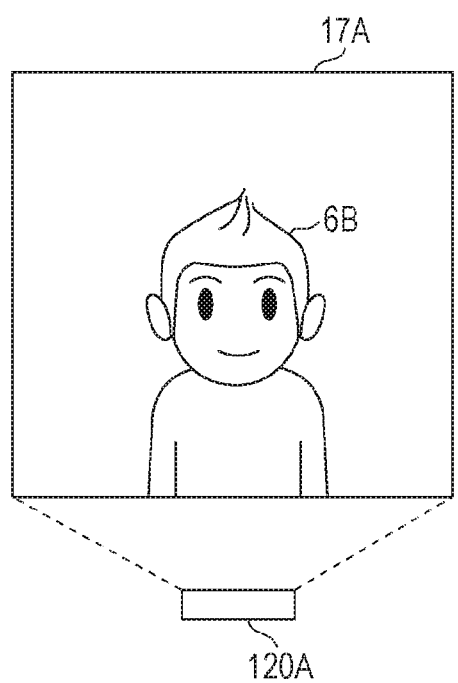
FIG. 12B A diagram of a field-of-view image of a user 5A in FIG. 12A according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12 (B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
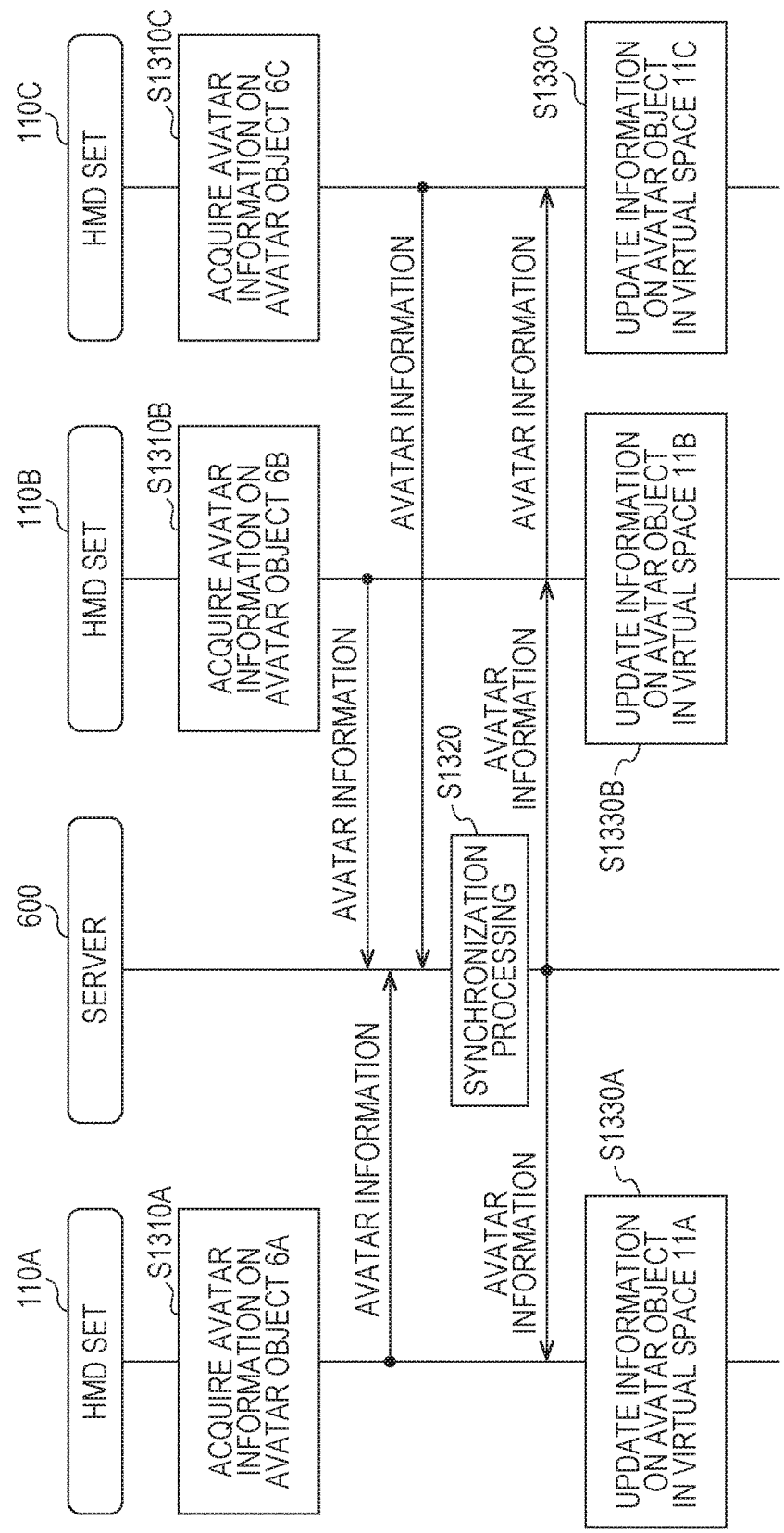
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
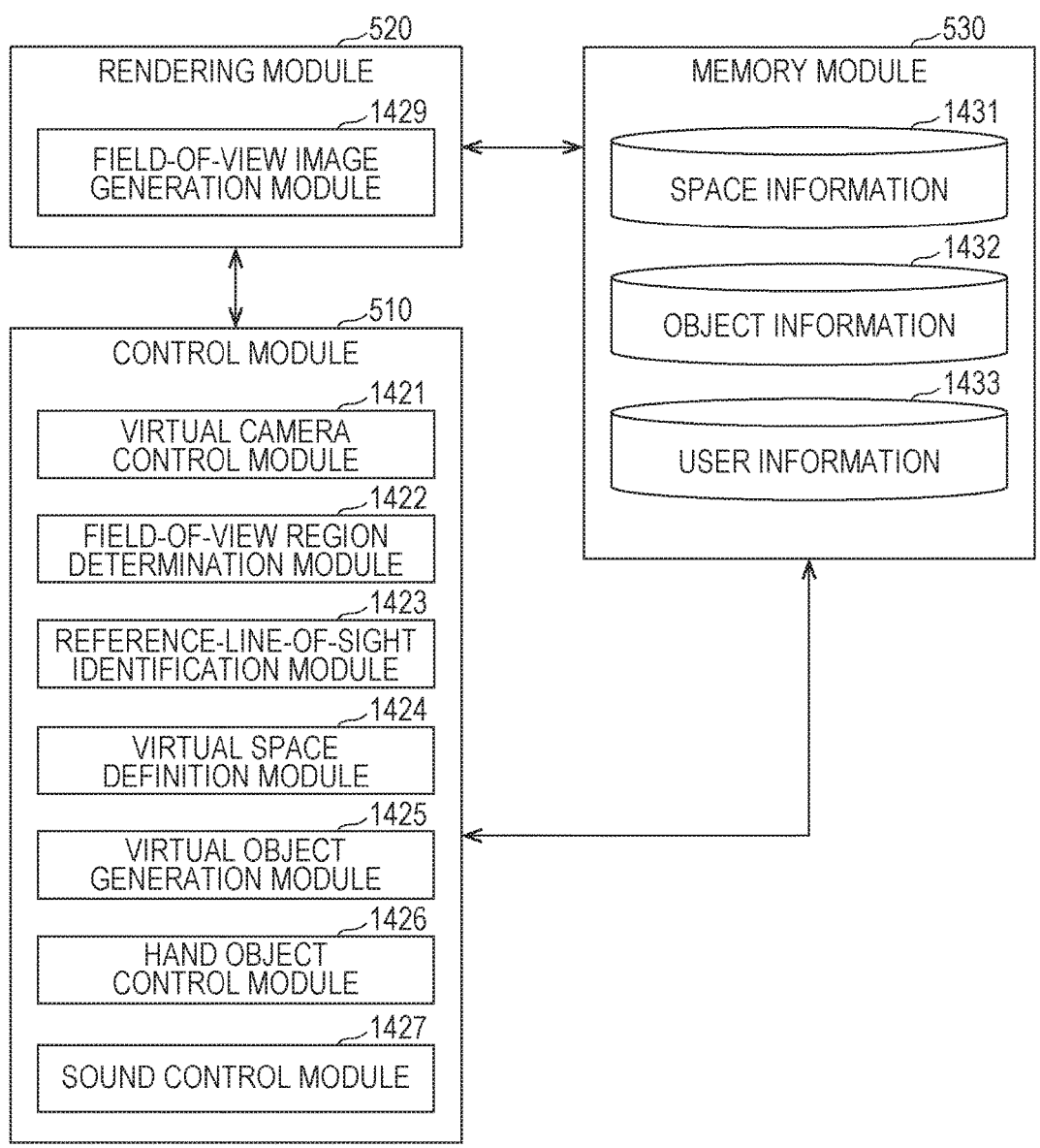
FIG. 14 A block diagram of a detailed configuration of modules of the computer according to at least one embodiment of this disclosure.

Now, with reference to FIG. 14, a description is given of details of a module configuration of the computer 200. FIG. 14 is a block diagram of the detailed configuration of modules of the computer 200 according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object generation module 1425, a hand object control module 1426, and a sound control module 1427. The rendering module 520 includes a field-of-view image generation module 1429. The memory module 530 stores space information 1431, object information 1432, and user information 1433.

In at least one aspect, the control module 510 controls display of an image on the monitor 130 of the HMD 120. The virtual camera control module 1421 arranges the virtual camera 14 in the virtual space 11, and controls, for example, the behavior and direction of the virtual camera 14. The field-of-view region determination module 1422 defines the field-of-view region 15. The field-of-view image generation module 1429 generates a field-of-view image 17 to be displayed on the monitor 130 based on the determined field-of-view region 15.

The reference-line-of-sight identification module 1423 identifies the line of sight of the user 5 based on the signal from the eye gaze sensor 140.

The control module 510 controls the virtual space 11 to be provided to the user 5. The virtual space definition module 1424 generates virtual space data representing the virtual space 11, to thereby define the virtual space 11 in the HMD set 110.

The virtual object generation module 1425 generates a target object to be displayed in the virtual space 11. As an example, the target objects include an avatar of a user of another HMD set 110 on the network 2 and an installation object such as a stage and a screen in an event site. In some examples, the target objects include, for example, landscapes including forests, mountains, and others, and animals, which are displayed in accordance with the progression of the story of the game. Further, in some examples, the target objects include avatars of a partner soldier and an enemy soldier, a construction, objects that are installed in a camp, such as a folding screen and a chair, and horses and tanks to be used for combat, which are displayed in a combat game. Further, in some examples, the target objects includes an object, for example, a vase, which is set to be moved (dropped) by an avatar object and/or a hand object operable by the user colliding with the object, and an enemy object moving toward the avatar object operable by the user. In at least one embodiment of this disclosure, the mode of movement (drop) of an object, for example, the vase, follows calculation of physics. Further, in some examples, the target objects include an object that is set to collide with a floor object by being thrown in the virtual space by input operation of the user and generate sound due to this collision. Further, in some examples, the target objects include an enemy object that is set to be moved toward sound generated by collision between the floor object and the object. When the target object is arranged together with a light source having a relatively suppressed light amount in a virtual space derived from a horror story, the user can be provided with a feeling of fear of moving in darkness.

The hand object control module 1426 arranges the hand object in the virtual space 11. In the following description, the hand object arranged in the virtual space 11 is also referred to as "virtual hand". The hand object corresponds to, for example, a right hand or a left hand of the user 5 holding the controller 300. In at least one aspect, the hand object management module 1426 generates data for arranging a left hand object or a right hand object in the virtual space 11. In at least one aspect, the hand object management module 1426 generates data for indicating motion of a left hand object or a right hand object rotating another object in response to operation of the controller 300 by the user 5. This operation includes, for example, a hand holding a steering wheel represented as an object rotating the steering wheel.

The space information 1431 stores one or more templates that are defined to provide the virtual space 11.

The object information 1432 stores content to be reproduced in the virtual space 11, information for displaying an object to be used in the content, and data on sound to be output in the content. The content may include, for example, a game or content representing a scenery similar to that of the real world.

The user information 1433 stores, for example, a program for causing the computer 200 to function as an apparatus for controlling the HMD set 110, and an application program that uses each content held in the object information 1432.

The sound control module 1427 controls output of sound by the speaker 180. For example, the sound control module 1427 causes the speaker 180 to output sound in accordance with the sound data held in the object information 1432.

[Outline of Disclosure]

Figure 15:
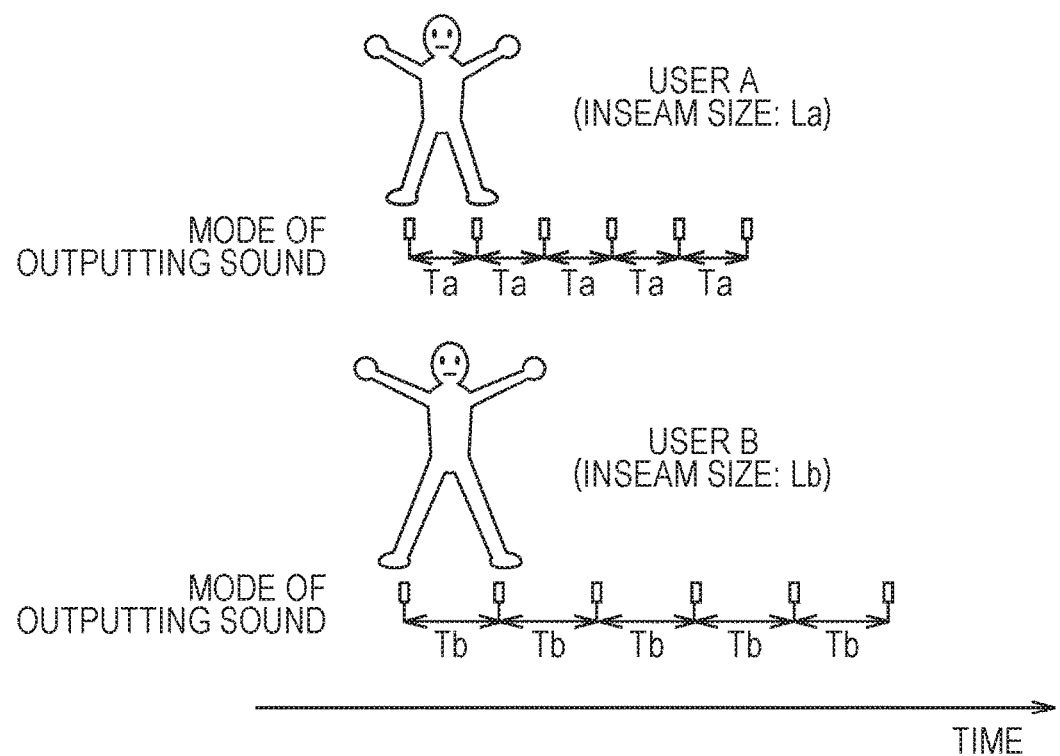
FIG. 15 A schematic diagram of an example of a mode of outputting sound by the computer according to at least one embodiment of this disclosure.

A computer according to at least one embodiment of this disclosure updates a field-of-view image to be displayed on a head-mounted device used by each user, and outputs sound in a mode that follows the setting of the physical size of each user. FIG. 15 is a schematic diagram of an example of a mode of outputting sound by the computer according to at least one embodiment of this disclosure.

FIG. 15 is a diagram of details of setting of inseam sizes of a user A and a user B as an example of setting of the physical size for those two users according to at least one embodiment of this disclosure. The inseam sizes of the user A and the user B are represented by a length La and a length Lb, respectively. The length Lb is longer than the length La.

FIG. 15 is a diagram of timings to output sound for each of the user A and the user B with a plurality of rectangles as a specific example of the mode of outputting sound when the virtual space is provided. The horizontal axis of FIG. 15 represents time. An interval between outputs of sound for the user A is a time Ta. An interval between outputs of sound for the user B is a time Tb. The time Tb is longer than the time Ta. In at least one aspect, for example, the ratio of the time Ta to the time Tb is equal to the ratio of the length La to the length Lb.

When a footfall is adopted as an example of sound to be output, the footfall corresponding to input for movement of the user A in the virtual space is output at intervals of the time Ta. On the other hand, the footfall corresponding to input for movement of the user B in the virtual space is output at intervals of the time Tb.

In this manner, in at least the example of FIG. 15, the computer updates the field-of-view image in the virtual space provided by the user, and outputs sound in the mode that follows the setting of the physical size of the user.

When the user hears sound in the virtual space, the user may unconsciously expect the sound to be output in the mode that follows the physical size of the user. The reason for this may be, for example, an experience of the user hearing sound that is output in accordance with the physical size of the user in the real space.

According to at least one embodiment of this disclosure, sound provided to the user is adjusted to be output in the mode that follows the setting of the physical size of the user. For example, a time interval between footfalls that are provided when the user moves in the virtual space is adjusted to follow the inseam size of the user. With this, deviation between the expected mode of outputting sound and the mode of outputting sound by the computer may be reduced. Therefore, VR sickness of the user may be reduced.

[Control Structure]

Figure 16:
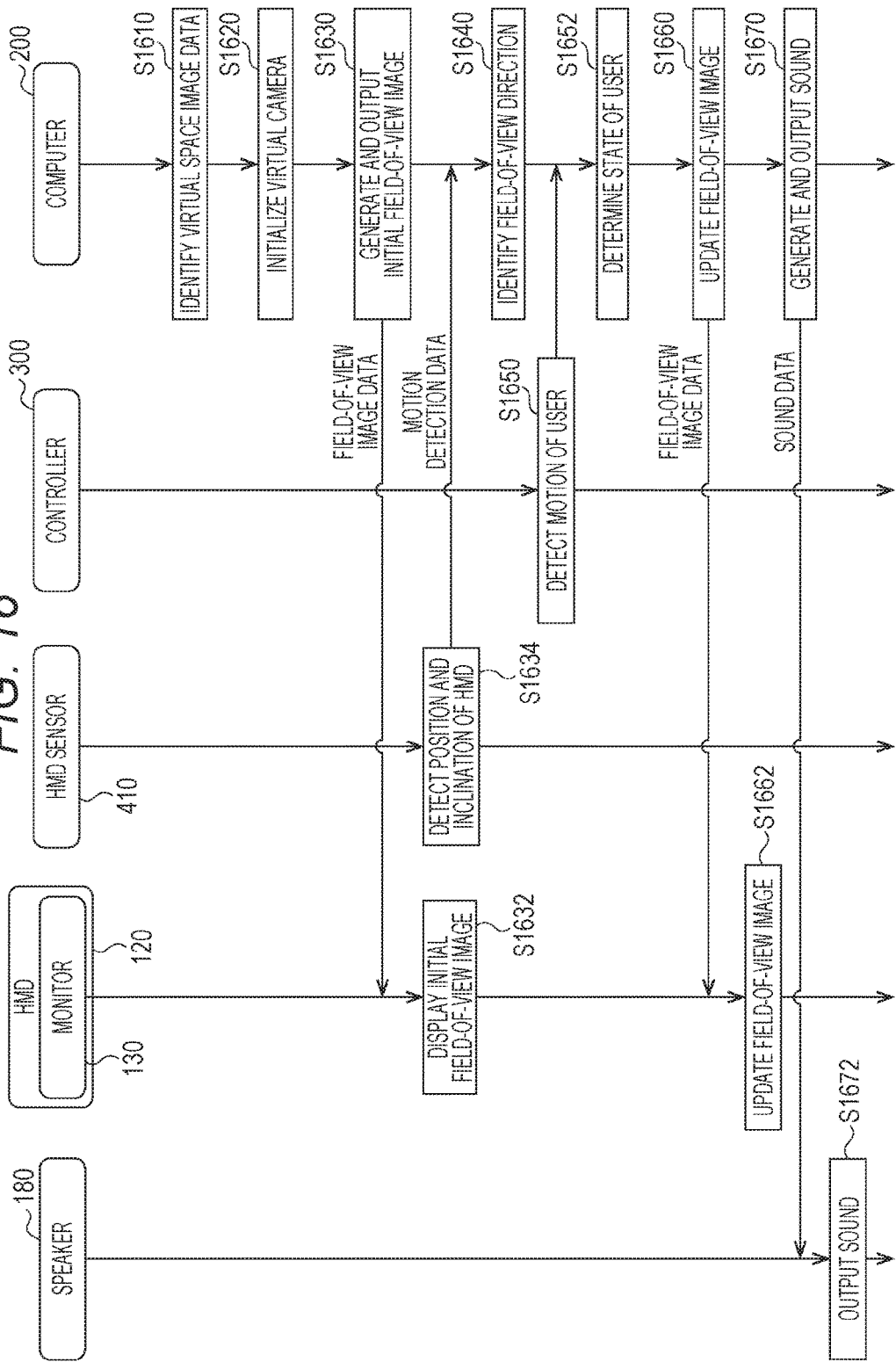
FIG. 16 A sequence chart of processing to be executed by a system including an HMD according to at least one embodiment of this disclosure.

Now, with reference to FIG. 16, a description is given of the control structure of the HMD set 110. FIG. 16 is a sequence chart of a part of processing to be executed by the HMD set 110 according to at least one embodiment of this disclosure.

In Step S1610, the processor 210 of the computer 200 serves as the virtual space definition module 1424 to identify virtual space image data.

In Step S1610, the processor 210 may transmit information for applying for participation in an event to, for example, the server 600. In response to this transmission, the server 600 may transmit, to the computer 200, image data (virtual space image data) on the virtual space representing the site of the event.

In Step S1620, the processor 210 initializes the virtual camera 14. For example, the processor 210 arranges the virtual camera 14 at the center defined in advance in the virtual space 11, and matches the line of sight of the virtual camera 14 with the direction in which the user 5 faces.

In Step S1630, the processor 210 serves as the field-of-view image generation module 1429 to generate field-of-view image data for displaying an initial field-of-view image. The generated field-of-view image data is transmitted to the HMD 120 by the communication control module 540 via the field-of-view image generation module 1429.

In Step S1632, the monitor 130 of the HMD 120 displays the field-of-view image based on the signal received from the computer 200. The user 5 wearing the HMD 120 may recognize the virtual space 11 through visual recognition of the field-of-view image.

In Step S1634, the HMD sensor 410 detects the position and the inclination of the HMD 120 based on a plurality of infrared rays emitted from the HMD 120. The detection results are transmitted to the computer 200 as motion detection data.

In Step S1640, the processor 210 identifies a field-of-view direction of the user 5 wearing the HMD 120 based on the position and inclination of the HMD 120. The processor 210 executes an application program, and displays an object in the virtual space 11 based on a command contained in the application program. The user 5 enjoys content visually recognizable in the virtual space 11 through execution of the application program.

In at least one aspect, the content includes an application (hereinafter also referred to as "event application") for causing the user to feel the event site. The event application provides the user with a scenery in the event site as the virtual space. The processor 210 changes the virtual space image to be visually recognized by the user depending on the position and inclination of the HMD 120.

In Step S1650, the controller 300 detects operation of the user 5, and transmits a signal indicating the detected operation to the computer 200. The signal contains operation for specifying one or more objects among two or more displayed objects. More specifically, the signal contains a signal indicating operation for displaying a virtual hand and representing motion of touching one or more objects among the two or more displayed objects with the virtual hand. The signal contains a signal indicating operation for selecting one or more menus from among the selected two or more menus.

In Step S1652, the processor 210 determines the state (state of application) of the user based on the signal received from the controller 300.

In Step S1660, the processor 210 updates the field-of-view image in accordance with the setting of the position and inclination of the HMD 120, operation of the user 5, and/or each object, and then transmits data (field-of-view image data) for displaying the updated field-of-view image to the HMD 120. The update of the field-of-view image may include anyone of change of the transparency of an object in the virtual space, deletion of the object, and movement of the object.

In Step S1662, the monitor 130 of the HMD 120 updates the field-of-view image based on the received field-of-view image data, and displays the updated field-of-view image. The update of the field-of-view image in Step S1662 is described later with reference to FIG. 17A, FIG. 17B, FIG. 18A, and FIG. 18B.

In Step S1660, the processor 210 updates the field-of-view image in accordance with the position and inclination of the HMD 120, operation of the user 5, and/or the setting of each object, and then transmits data (field-of-view image data) for displaying the updated field-of-view image to the HMD 120. The update of the field-of-view image may include any one of change of the transparency of an object in the virtual space, deletion of the object, or movement of the object.

In Step S1662, the monitor 130 of the HMD 120 updates a field-of-view image based on the received field-of-view image data, and displays the updated field-of-view image.

In Step S1670, the processor 210 generates sound in accordance with the execution result of the application program. In Step S1672, the sound is output from the speaker 180.

[Update of Field-Of-View Image]

Next, with reference to FIG. 17A, FIG. 17B, FIG. 18A, and FIG. 18B, a description is given of update of the field-of-view image, which is performed in Step S1662.

Figure 17B:
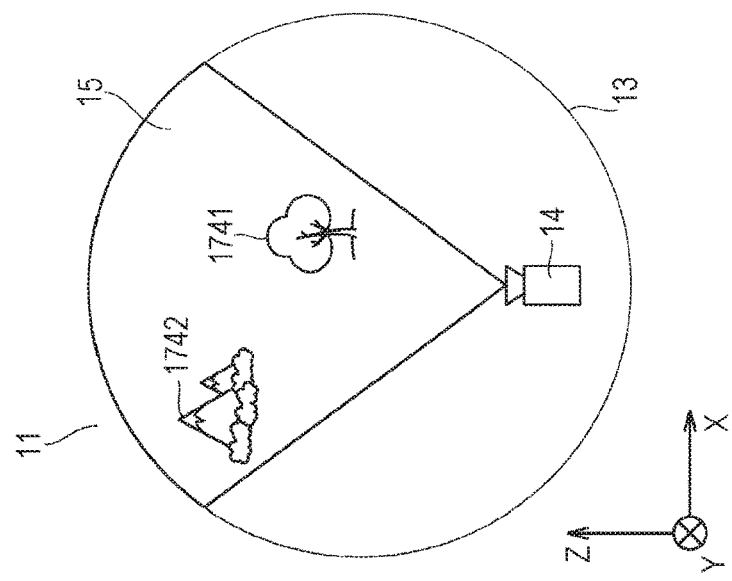
FIG. 17B A diagram of an example of the virtual space in the state in FIG. 17A according to at least one embodiment of this disclosure.
Figure 17A:
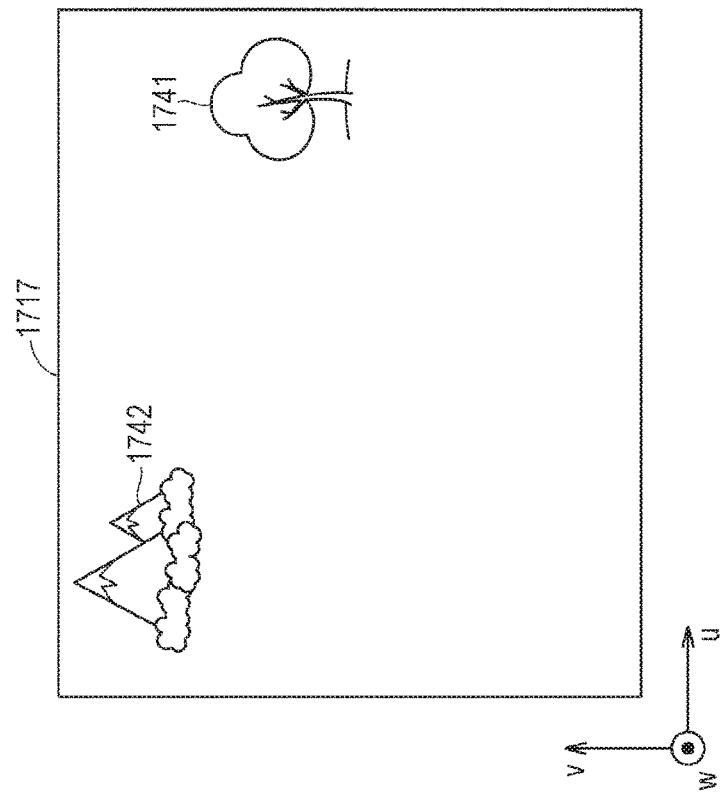
FIG. 17A A diagram of an example of a field-of-view image in a state before movement of the virtual camera according to at least one embodiment of this disclosure.

FIG. 17A and FIG. 17B are diagrams of a state of the virtual camera 14 before movement according to at least one embodiment of this disclosure. In FIG. 17A, in at least one aspect, the user 5 wearing the HMD 120 visually recognizes the field-of-view image 1717 in the virtual space 5. The field-of-view image 1717 contains a tree object 1741 and a mountain object 1742. At this time, in FIG. 17B, the virtual camera 14 photographs the field-of-view region 15 corresponding to the field-of-view image 1717.

Under the state in FIG. 17A and FIG. 17B, the user 5 gives a movement command to the controller 300. As an example, the user 5 tilts an analog stick installed on the controller 300 forward. As a result, the state in FIG. 17A and FIG. 17B changes to the state in FIG. 18A and FIG. 18B.

Figure 18B:
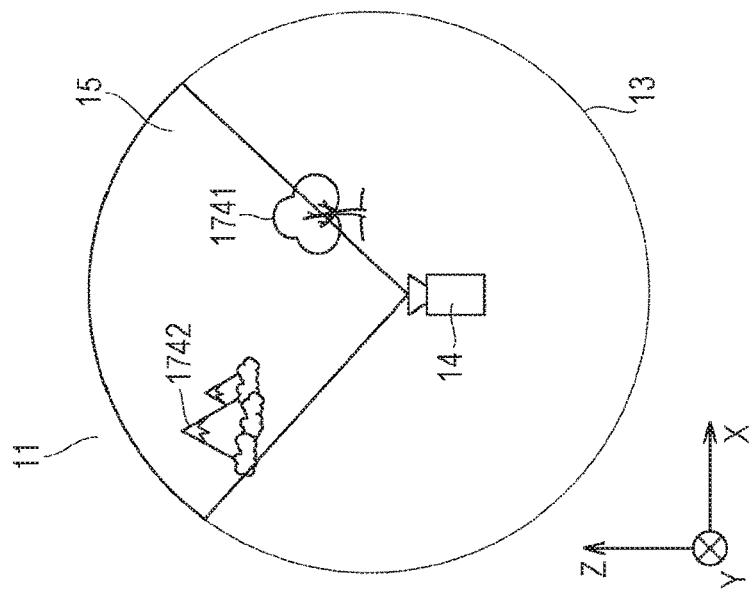
FIG. 18B A diagram of an example of the virtual space in the state in FIG. 18A according to at least one embodiment of this disclosure.
Figure 18A:
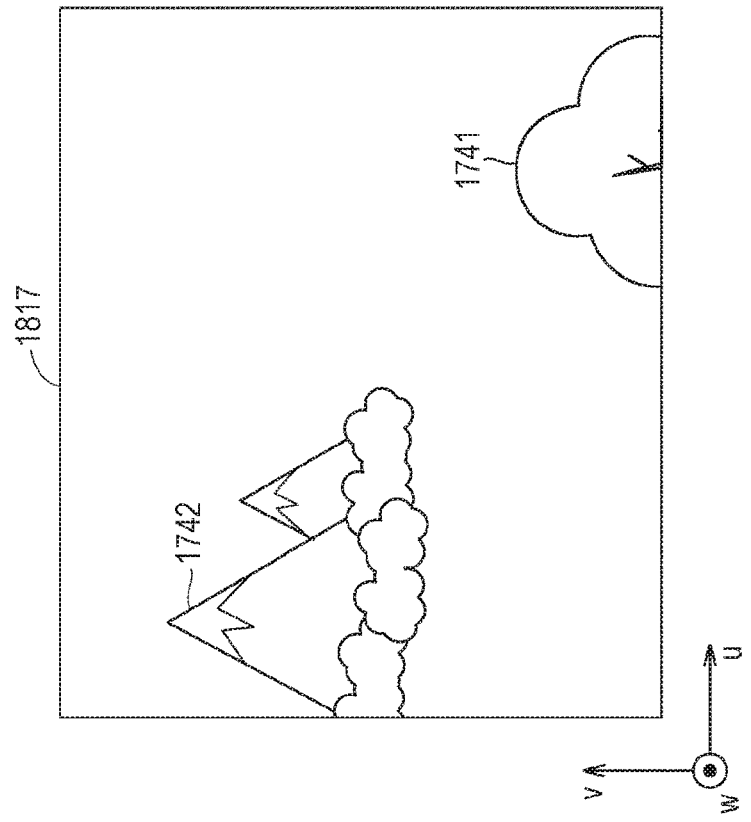
FIG. 18A A diagram of an example of a field-of-view image in a state after movement of the virtual camera according to at least one embodiment of this disclosure.

FIG. 18A and FIG. 18B are diagrams of a state of the virtual camera 14 after movement according to at least one embodiment of this disclosure. In response to a detection signal input from the controller 300, the processor 210 moves the virtual camera 14. More specifically, the processor 210 identifies the reference line-of-sight 16 of the virtual camera 14 before movement as a movement direction, and moves the virtual camera 14 in the identified movement direction.

In FIG. 18B, the virtual camera 14 (namely, viewpoint of user 5) is arranged forward compared to the state illustrated in FIG. 17B. The user visually recognizes a field-of-view image 1817 photographed by the virtual camera 14 after movement. Next, a description is given of control of movement of the virtual camera 14 with reference to FIG. 19 to FIG. 21.

[Input of Setting of Physical Size of User]

Now, a description is given of an example of input of setting of the physical size of the user in the computer 200. In the following description, the inseam size is adopted as an example of the setting of the physical size of the user.

Figure 19:
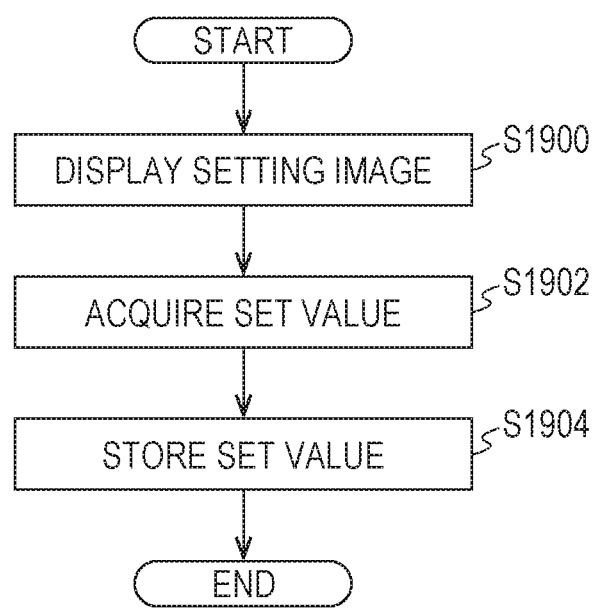
FIG. 19 A flowchart of processing for inputting, to the computer, setting of a physical size of the user according to at least one embodiment of this disclosure.

FIG. 19 is a flowchart of processing for inputting the setting of the physical size of the user to the computer 200 according to at least one embodiment of this disclosure. In the computer 200 according to at least one embodiment of this disclosure, when the processor 210 (FIG. 3) executes an application for providing the virtual space, the processor 210 uses a set value of the physical size of the user. The processor 210 acquires the set value prior to execution of the application or during execution of the application, for example, and stores the set value into the storage 230. The processing of FIG. 19 is started in response to, for example, the processor 210 receiving input of a command to set the physical size from the controller 300. The processor 210 implements the processing of FIG. 19 by, for example, executing a given program stored in the storage 230.

With reference to FIG. 19, in Step S1900, the processor 210 displays a setting screen on the HMD 120.

Figure 20:
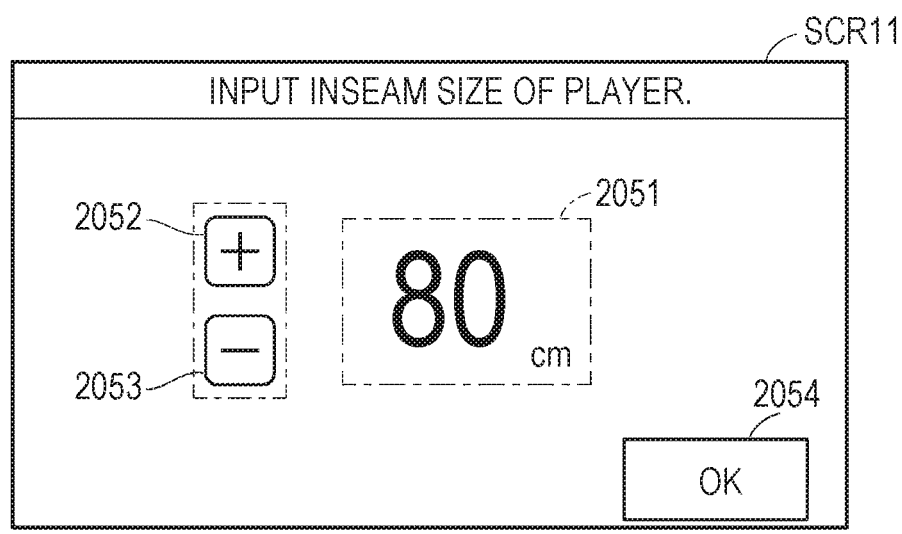
FIG. 20 A diagram of an example of a setting screen according to at least one embodiment of this disclosure.

FIG. 20 is a diagram of an example of the setting screen. A screen SCR11 of FIG. 20 includes a message "Input inseam size of player" according to at least one embodiment of this disclosure. The screen SCR11 further includes an input field 2051, change buttons 2052 and 2053, and an OK button 2054. The input field 2051 displays the input inseam size. In FIG. 20, "80 cm" is displayed as an example. The change buttons 2052 and 2053 are operated to change the size input to the input field 2051. The OK button 2054 is operated to establish the size input to the input field 2051. The user inputs a command to, for example, the controller 300 to operate the change buttons 2052 and 2053 and the OK button 2054.

Referring back to FIG. 19, in Step S1902, the processor 210 acquires a set value of the inseam size. The processor 210 acquires, for example, the size input to the input field 2051 when the OK button 2054 is operated on the screen SCR11 of FIG. 20 as the set value.

In Step S1904, the processor 210 stores the set value acquired in Step S1902 into the storage 230.

As described above, through the processing described above with reference to FIG. 19, the set value of the inseam size of the user is stored into the storage 230.

[Provision of Virtual Space]

Figure 21:
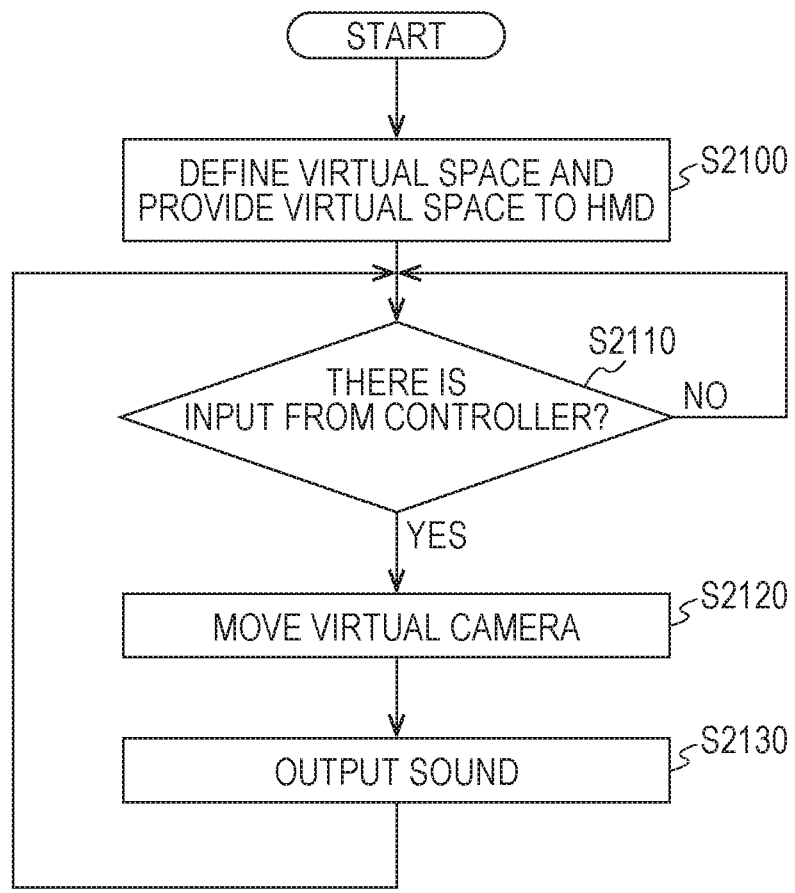
FIG. 21 A flowchart of processing to be executed by a processor to provide the virtual space according to at least one embodiment of this disclosure.

Next, a description is given of an example of provision of the virtual space that uses a set value of the inseam size of the user. FIG. 21 is a flowchart of processing to be executed by the processor 210 to provide the virtual space according to at least one embodiment of this disclosure. In at least one embodiment of this disclosure, the processing of FIG. 21 is executed as a part of the application program for providing the virtual space. The processor 210 implements the processing of FIG. 21 by, for example, executing a given program stored in the storage 230.

With reference to FIG. 21, in Step S2100, the processor 210 serves as the virtual space definition module 1424 (FIG. 14) to define the virtual space 11 (e.g., FIG. 4), and provides the HMD 120 worn by the user with the virtual space 11. The virtual space 11 is defined in accordance with, for example, a predetermined application program.

In Step S2110, the processor 210 determines whether or not there is input from the controller 300. The processor 210 holds the control in Step S2110 until there is input from the controller 300 (NO in Step S2110), and when the processor 210 determines that there is input from the controller 300 (YES in Step S2110), the processor 210 advances the control to Step S2120.

In Step S2120, the processor 210 moves, in accordance with an execution result of the application program that follows input from the processor 210, the virtual camera 14 (FIG. 14) from a position before the input to a position that follows the execution result. As a result, the field-of-view image provided to the user is updated. The movement direction of the virtual camera 14 in Step S2120 is identified in accordance with the state of the application program that uses the provided virtual space.

In one example, the inclination of the HMD 120 (namely, the reference line-of-sight 16 (e.g., FIG. 4)) is applied as the movement direction of the virtual camera 14. The inclination of the HMD 120 is identified based on output of the HMD sensor 410. As a result, the provided field-of-view image is updated so that the field of view of the user in the virtual space moves along the direction (direction of HMD 120 worn by user) of the user.

In at least one example, the movement direction of the virtual camera 14 is identified by an application program. As a result, the field of view of the user in the virtual space is moved in a specific direction irrespective of the direction of the user. For example, when an application program that uses the provided virtual space relates to a combat game and the user is in a state of requiring a team meeting during movement, the provided field-of-view image is updated so that the field of view of the user moves toward a team meeting site irrespective of the direction of the user.

The processor 210 may skip movement of the virtual camera 14 in Step S2120 depending on the execution result of the application program.

In Step S2130, the processor 210 outputs sound from the speaker 180 in accordance with the execution result of the application program that follows input from the controller 300. The processor 210 adjusts the mode of outputting sound of a predetermined type in accordance with the setting of the physical size of the user. For example, when sound to be output is a footfall of the user, an output interval between footfalls is adjusted in accordance with the inseam size of the user. In one example, as the inseam size becomes larger, the output interval between footfalls becomes longer. After that, the control returns to Step S2110.

The processor 210 may skip output of sound from the speaker 180 depending on the execution result of the application program.

In at least one embodiment of this disclosure, in Step S2110, the processor 210 determines whether or not there is input from the HMD 120 instead of input from the controller 300. The HMD 120 detects movement, and then outputs information to the processor 210 in response to the detection. The information is input to the processor 210 from the HMD 120. In Step S2120, the processor 210 may move, in accordance with the execution result of the application program that follows input from the HMD 120, the position before the input to the position that follows the execution result. In Step S2130, the processor 210 may output sound from the speaker 180 in accordance with the execution result of the application program that is based on detection of motion by the HMD 120.

[Input of Setting of Physical Size of User Using Controller]

Figure 22:
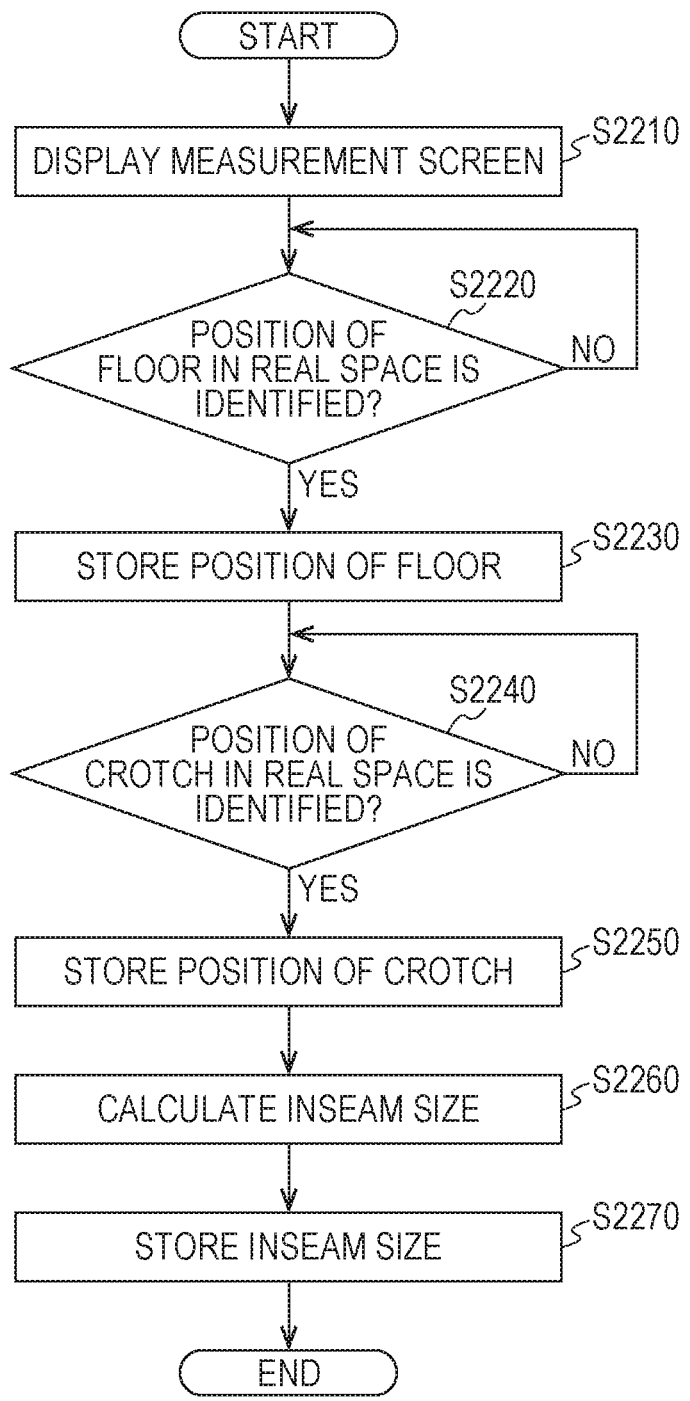
FIG. 22 A flowchart of processing for inputting setting of the physical size of the user using a controller (sensor) described with reference to FIG. 17A, FIG. 17B, FIG. 18A, and FIG. 18B according to at least one embodiment of this disclosure.

FIG. 22 is a flowchart of processing for inputting setting of the physical size of the user using the controller 300 (sensor 420) according to at least one embodiment of this disclosure. For example, when the processor 210 receives input of an instruction to start setting the physical size of the user from the controller 300, the processor 210 starts the processing of FIG. 22. The processor 210 implements the processing of FIG. 22 by, for example, executing a given program stored in the storage 230.

With reference to FIG. 22, in Step S2210, the processor 210 displays a measurement screen on the HMD 120. The measurement screen in this case refers to a screen for guiding the user to measure a set value relating to the physical size of the user.

Figure 23:
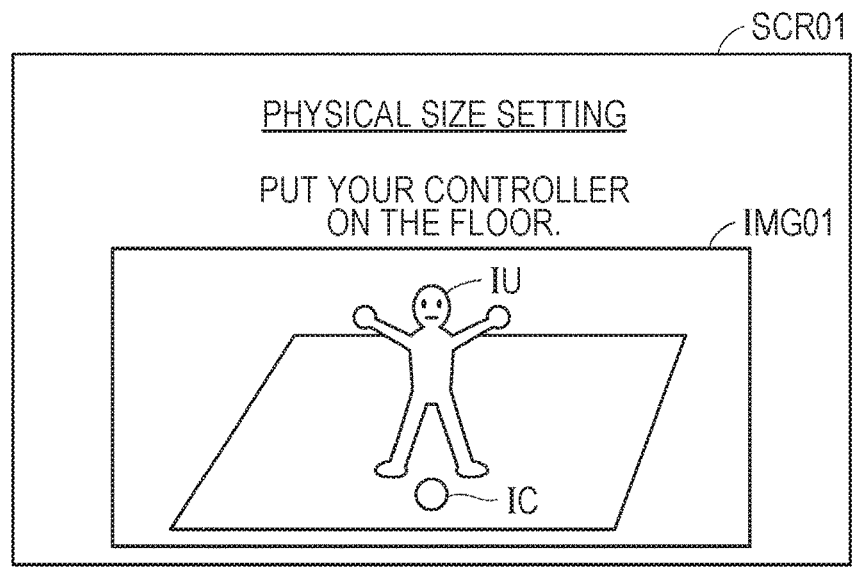
FIG. 23 A diagram of an example of a measurement screen according to at least one embodiment of this disclosure.

FIG. 23 is a diagram of an example of the measurement screen according to at least one embodiment of this disclosure. In FIG. 23, a screen SCR01 includes a message "Put your controller on the floor" and an image IMG01. The image IMG01 includes a picture IU indicating the user and a picture IC indicating the controller 300. The image IMG01 represents a state of the controller 300 being placed on the floor. When the user visually recognizes the image IMG01, the user understands that the controller 300 is to be placed on the floor, and places the controller 300 in the real space in accordance with his or her understanding.

In Step S2220, the processor 210 determines whether or not a position on the floor in the real space is identified. When, for example, the processor 210 identifies the position of the sensor 420 in the controller 300 by the controller 300 remaining at rest for a fixed period of time or more, the processor 210 determines that the position of the floor in the real space is identified. The processor 210 holds the control in Step S2220 until determination of identification of the position of the floor in the real space (NO in Step S2220). In response to a determination by processor 210 that the position of the floor in the real space is identified (YES in Step S2220), the processor 210 advances the control to Step S2230.

In Step S2230, the processor 210 stores the position of the floor identified in Step S2220 into the storage 230 (FIG. 2).

In Step S2240, the processor 210 determines whether or not the position of a crotch of the user in the real space is identified. After the control of Step S2230, the processor 210 may display, on the HMD 120, a screen for guiding the user to place the controller 300 at the height of the crotch of the user.

Figure 24:
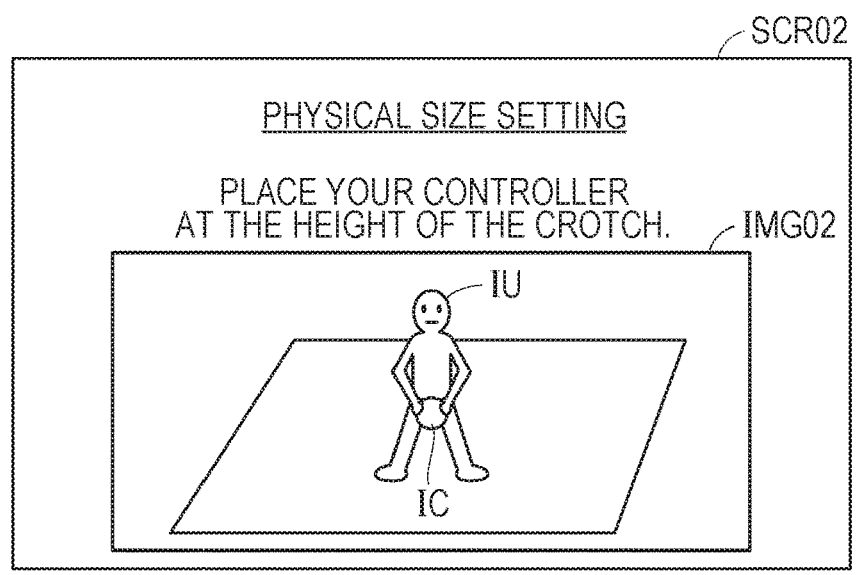
FIG. 24 A diagram of an example of a screen for guiding the user to place the controller at the height of a crotch of the user according to at least one embodiment of this disclosure.

FIG. 24 is a diagram of an example of the screen for guiding the user to place the controller 300 at the height of the crotch of the user according to at least one embodiment of this disclosure. In FIG. 24, a screen SCR02 includes a message "Place your controller at the height of the crotch" and an image IMG02. The image IMG02 includes a picture IU indicating the user and a picture IC indicating the controller 300. The image IMG02 represents a state of the controller 300 being placed at the height of the crotch of the user. When the user visually recognizes the image IMG02, the user understands that the controller 300 is to be placed at the height of the crotch of the user, and keeps the controller 300 at a position of the crotch of the user in the real space in accordance with his or her understanding.

In Step S2240, the processor 210 determines whether or not the position of the crotch of the user in the real space is identified. In response to, for example, the processor 210 identifying the position of the sensor 420 in the controller 300 by the controller 300 remaining at rest for a fixed period of time or more, the processor 210 determines that the position of the crotch is identified. The processor 210 holds the control in Step S2240 until determination of identification of the position of the crotch of the user (NO in Step S2240). In response to a determination by the processor 210 that the position of the crotch of the user is identified (YES in Step S2240), the processor 210 advances the control to Step S2250.

In Step S2250, the processor 210 stores the position of the crotch of the user identified in Step S2240 into the storage 230 (FIG. 2).

In Step S2260, the processor 210 calculates the inseam size of the user. As an example, the processor 210 calculates a distance between the position of the floor stored in Step S2230 and the position of the crotch stored in Step S2250, to thereby calculate the inseam size of the user.

In Step S2270, the processor 210 stores the inseam size calculated in Step S2260 into the storage 230 as the set value relating to the physical size of the user. After that, the processor 210 ends the processing of FIG. 22.

[Cooperation Between Visual and Auditory Effects Due to Movement of User in Virtual Space]

As described in the above-mentioned at least one embodiment, when the processor 210 moves the virtual camera 14, the processor 210 adjusts the timing to output sound, for example, footfalls to be output at the time of movement in the virtual space, in accordance with the physical size (e.g., inseam length) of the user of the HMD 120. With this, the user is provided with sound that is adjusted in accordance with the physical size of the user, and the processor 210 may suppress the VR sickness of the user.

When the processor 210 moves the virtual camera 14 along a certain plane, the processor 210 may vibrate the virtual camera 14 in an axial direction perpendicular to that plane. The distance of the vibration of the virtual camera 14 may be determined in accordance with the setting of the physical size of the user. When the user moves, for example, by walking, in the real space, the head of the user vibrates in synchronization with the timing to execute a unit action, for example, taking a step forward. In at least one embodiment of this disclosure, the processor 210 is able to represent vibration of the head that follows movement in the real space by using vibration of the virtual camera 14 described above.

In the following, a more specific description is given of vibration of the virtual camera 14.

(Displacement of Virtual Camera in v-Axis Direction)

Figure 25:
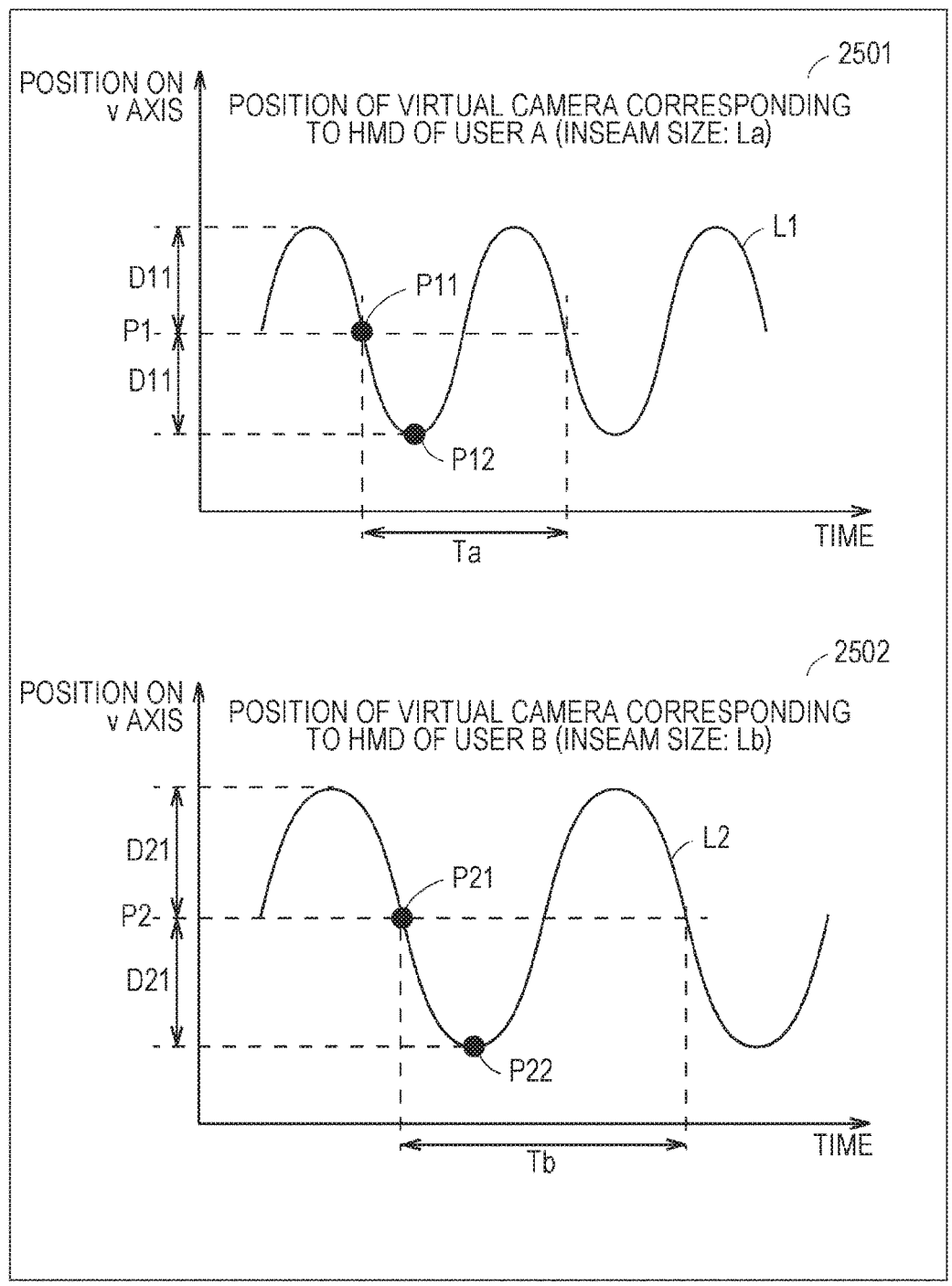
FIG. 25 A diagram of a mode of vibration of the virtual camera that follows the setting of the physical size of the user according to at least one embodiment of this disclosure.

FIG. 25 is a diagram of a mode of vibration of the virtual camera 14 that follows the setting of the physical size of the user according to at least one embodiment of this disclosure. A graph 2501 of FIG. 25 represents a change in position of the virtual camera 14 that corresponds to the HMD 120 to be used by the user A having an inseam size La. A graph 2502 of FIG. 25 represents a change in position of the virtual camera 14 that corresponds to the HMD 120 to be used by the user B having an inseam size Lb.

In at least one embodiment of this disclosure, the virtual camera 14 moves along a plane defined by the u axis and the w axis among the three axes (u axis (pitch direction), v axis (yaw direction), and w axis (roll direction)) in the uvw visual-field coordinate system, and also vibrates along the v axis. In the graphs 2501 and 2502, the vertical axis represents the position of the virtual camera 14 in the v-axis direction and the horizontal axis represents time.

The graph 2501 represents the position of the virtual camera 14 in the virtual space provided by the HMD 120 used by the user A having the inseam size La. In the graph 2501, a line L1 represents a change in position in the v-axis direction of a specific position (e.g., point on reference-line-of-sight on plane positioned a predetermined distance away from virtual camera 14) of the field of view of the virtual camera 14. In the graph 2501, the position in the v-axis direction of the virtual camera 14 vibrates in a range of a distance D11 in each of an upward/downward direction relative to a position P1. A period of the change in position is a time Ta (FIG. 15). Points P11 and P12 on the line L1 are referred to in FIG. 26A and FIG. 26B described later.

The graph 2502 represents the position of the virtual camera 14 in the virtual space provided by the HMD 120 used by the user B having the inseam size Lb. In the graph 2502, a line L2 represents a change in position in the v-axis direction of a specific position (e.g., point on reference-line-of-sight on plane positioned a predetermined distance away from virtual camera 14) of the field of view of the virtual camera 14. In the graph 2502, the position in the v-axis direction of the virtual camera 14 vibrates in a range of a distance D21 in each of an upward/downward direction relative to a position P2. A period of the change in position is a time Tb (FIG. 15). Points P21 and P22 on the line L2 are referred to in FIG. 26A and FIG. 26B described later.

In the example of FIG. 25, the period of vibration in the v-axis direction is set in accordance with setting of the physical size of the user. As described with reference to FIG. 15, this corresponds to the fact that the inseam size Lb is larger than the inseam size La and the time Tb is longer than the time Ta. The inseam size is an example of the setting of the physical size of the user.

The distance of vibrations of the virtual camera 14 in the v-axis direction is set in accordance with the setting of the physical size of the user. This corresponds to the fact that the inseam size Lb is larger than the inseam size La, and a distance D21 is longer than the distance D11.

(Displacement of Object in Field-Of-View Image)

Figure 26:
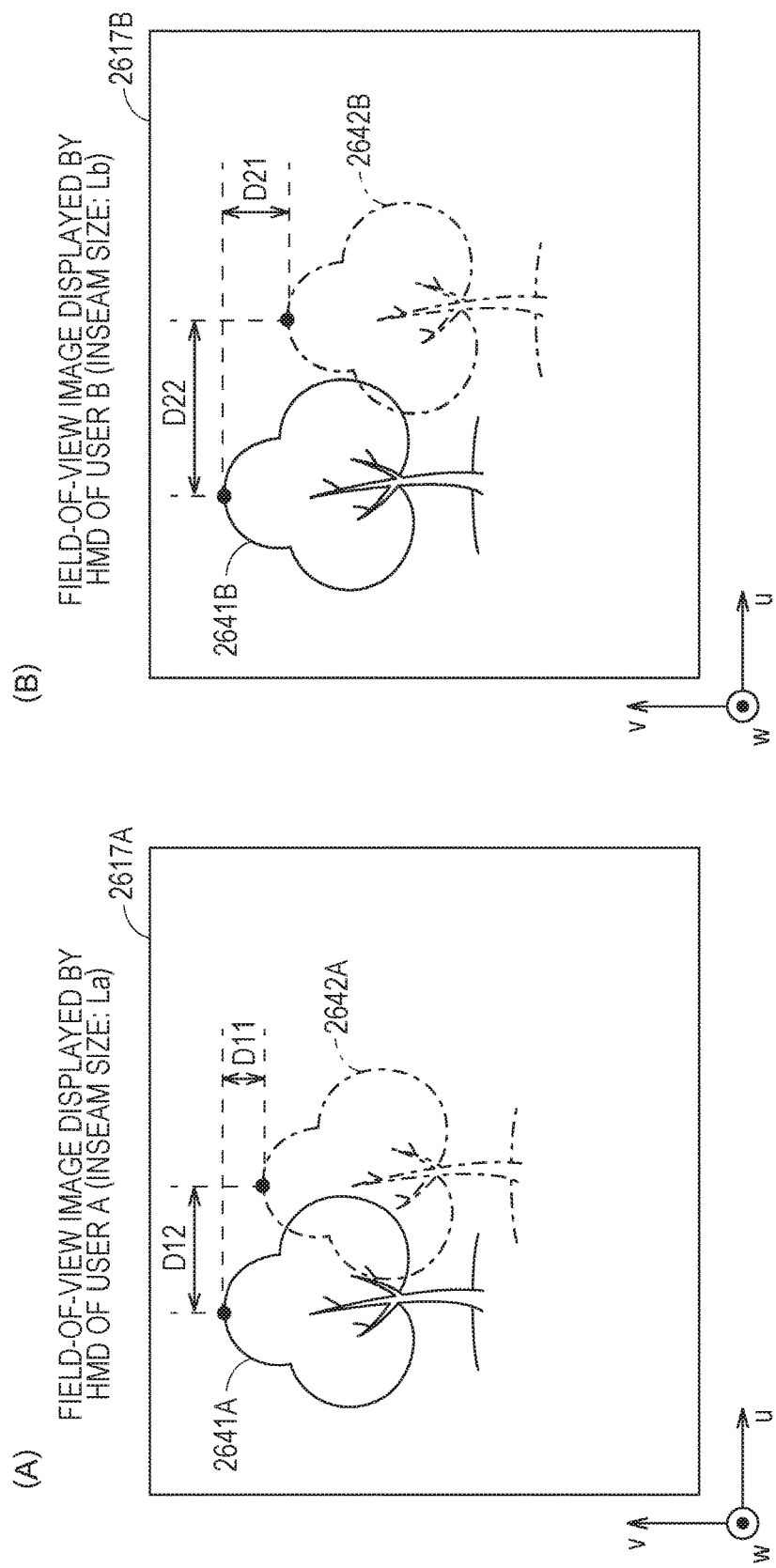
FIG. 26A A diagram of how an object is displaced in a field-of-view image of a user A in synchronization with vibration of the virtual camera according to at least one embodiment of this disclosure.
FIG. 26B A diagram of how an object is displaced in a field-of-view image of a user B in synchronization with vibration of the virtual camera according to at least one embodiment of this disclosure.

FIG. 26A and FIG. 26B are diagrams of how an object is displaced in the field-of-view image in synchronization with vibration of the virtual camera 14 according to at least one embodiment of this disclosure. FIG. 26A and FIG. 26B are of field-of-view images 2617A and 2617B visually recognized by the user wearing the HMD 120 in the three axes (u axis (pitch direction), v axis (yaw direction), and w axis (roll direction)) in the uvw visual-field coordinate system.

The field-of-view image 2617A of FIG. 26A is displayed by the HMD 120 used by the user A having the inseam size La. In the field-of-view image 2617A, a position 2641A represents a position of a tree object at a timing of the point P11 on the line L1 of FIG. 25. A position 2642A represents a position of a tree object at a timing of the point P12. In FIG. 26A, the position 2642A is displaced by the distance D11 (refer to FIG. 25) in the v axis with respect to the position 2641A, and is displaced on the plane defined by the u axis and w axis by a distance D12.

The field-of-view image 2617B of FIG. 26B is displayed by the HMD 120 used by the user B having the inseam size Lb. In the field-of-view image 2617B, a position 2641B represents a position of a tree object at a timing of the point P21 on the line L2 of FIG. 25. A position 2642B represents a position of a tree object at a timing of the point P22. In FIG. 26B, the position 2642B is displaced by the distance D21 (refer to FIG. 25) in the v axis with respect to the position 2641B, and is displaced on the plane defined by the u axis and w axis by a distance D22.

The period from the point P11 to the point P12 on the line L1 corresponds to one-fourth of a vibration period in the v axis. The period from the point P21 to the point P22 on the line L12 corresponds to one-fourth of the vibration period in the v axis. In at least one embodiment of this disclosure, the vibration period of an object corresponds to movement of the virtual camera 14 at the time when the HMD 120 detects a predetermined amount of movement.

In at least one embodiment of this disclosure, the processor 210 determines the distance of vibration of the virtual camera 14 on the v axis due to operation of the controller 300 in accordance with the setting of the physical size of the user. This corresponds to the fact that the inseam size Lb (FIG. 26B) of the user B is larger than the inseam size La (FIG. 26A) of the user A and the distance D21 (FIG. 26B) is longer than the distance D11 (FIG. 26A). In at least one embodiment, the processor 210 vibrates the virtual camera 14 in the axial direction perpendicular to a plane on which the user is movable in the virtual space, to thereby be able to represent vibration of the head of the user moving in the virtual space. An example of the direction in which the virtual camera 14 vibrates is an axis (v axis) defined by a body axis of the avatar object of the user who is able to walk on a certain plane (plane defined by u axis and w axis). The magnitude of vibration of the head of the user is adjusted in accordance with the setting of the physical size of the user.

In at least one embodiment of this disclosure, the processor 210 determines the movement distance of the virtual camera 14 on the plane defined by the u axis and the w axis at the time when, for example, the HMD 120 detects a predetermined amount of movement, in accordance with the setting of the physical size of the user. This corresponds to the fact that the inseam size Lb (FIG. 26B) of the user B is larger than the inseam size La (FIG. 26A) of the user A and the distance D22 (FIG. 26B) is longer than the distance D12 (FIG. 26A).

[Summary of Disclosure]

The technical features of at least one embodiment of this disclosure disclosed above are summarized in the following manner, for example.

(1) According to at least one embodiment of this disclosure, there is provided a method to be executed on a computer (computer 200) to provide a virtual space via a head-mounted device (HMD 120). Control to be executed on the computer 200 includes defining (Step S2100 of FIG. 21) a virtual space. The control further includes receiving (FIG. 19 and FIG. 22) setting of a physical size of a user of a head-mounted device. The control further includes receiving (Step S2110 of FIG. 21) input for movement of the user in the virtual space. The control further includes updating (Step S2120 of FIG. 21) a field-of-view image in the virtual space to be displayed on the head-mounted device in accordance with the input for movement. The control further includes outputting (Step S2130 of FIG. 21) sound in the virtual space in accordance with the input for movement. The sound to be output is adjusted in accordance with the setting of the physical size of the user (FIG. 15). An example of the input for movement of the user in the virtual space is walking and other motion of four limbs. At least one example thereof is operation of controllers corresponding to the four limbs.

(2) According to at least one embodiment, the setting of the physical size of the user includes an inseam length of the user. Another example of the setting of the physical size of the user is a height of the user. According to at least one embodiment, the processor 210 applies a set value of the user height to a mathematical expression set in advance, to thereby calculate the inseam size of the user for use in adjustment of sound to be output.

At least one example of the setting of the physical size of the user is a length of an arm of the user. In at least one embodiment of this disclosure, an application program provides, as the virtual space, a situation in which the user is swimming in a swimming pool. When the user operates the controller 300 by a predetermined amount, the processor 210 moves the virtual camera 14 as if, for example, the user had swum in front crawl by a number of strokes determined in advance. When the processor 210 outputs sound by a number of strokes determined in advance, the processor 210 adjusts a time interval between strokes in accordance with the length of the arm of the user. In at least one example, as the arm of the user becomes longer, the time interval between strokes becomes longer.

According to at least one embodiment, the controller 300 is used for measurement of the length of the arm of the user. In one example, the processor 210 calculates the length of the arm of the user as a distance between the position of the sensor 420 at the time when the controller 300 is positioned at the fingertip of the user and the position of the sensor 420 at the time when the controller 300 is positioned at the root of the arm of the user.

(3) According to at least one embodiment, a mode of outputting sound is adjusted through adjustment of a timing to output sound in accordance with the inseam length. At least one example of the mode of outputting sound to be adjusted in accordance with the setting of the physical size of the user is the length of the sound to be output. For example, as described above, when the situation in which the user is swimming in the swimming pool is provided as the virtual space, as the length of the arm becomes longer, the sound (stroking sound) to be output by one stroke becomes longer.

(4) According to at least one embodiment, the processor 210 receives the setting of the physical size of the user by detecting a position of a device (controller 300) for position detection at the time when the device is arranged at a predetermined position of the body of the user (FIG. 22 to FIG. 24).

(5) According to at least one embodiment, the device (controller 300) for position detection, which is used for inputting the setting of the physical size of the user, is also used for inputting movement of the user. With this, the user is able to use the controller, which is generally used for, for example, operation of a virtual hand, to set the physical size of the user without any additional configuration.

(6) According to at least one embodiment, the processor 210 detects motion (inclination of HMD 120) of the head-mounted device as input for movement of the user in the virtual space (Step S2120 of FIG. 21). According to at least one embodiment, the updating of the field-of-view image in the virtual space includes arranging the virtual camera at a location that is based on a result of detecting motion of the head-mounted device in the virtual space, to thereby display, in the head-mounted device, a field-of-view image that is based on the arrangement position of the virtual camera (FIG. 26A and FIG. 26B). According to at least one embodiment, the updating of the field-of-view image in the virtual space includes updating the field-of-view image by moving the virtual camera on a plane defined by two axes among three axes forming the virtual space in accordance with operation of the device for position detection (movement of object in horizontal direction containing u axis and w axis in each of field-of-view images 2617A and 2617B of FIG. 26A and FIG. 26B). The movement amount of the virtual camera on the plane is determined in accordance with the setting of the physical size (distance D12 corresponding to inseam size La and distance D22 corresponding to inseam size Lb in FIG. 26A and FIG. 26B).

(7) According to at least one embodiment, the updating of the field-of-view image in the virtual space includes vibrating the virtual camera in an axial direction perpendicular to a plane among the three axes forming the virtual space in accordance with operation of the device for position detection (movement of object in v-axis direction in each of field-of-view images 2617A and 2617B of FIG. 26A and FIG. 26B). According to at least one embodiment, the distance of vibration of the virtual camera in the axial direction perpendicular to the plane is determined in accordance with the setting of the physical size (distance D11 corresponding to inseam size La and distance D21 corresponding to inseam size Lb in FIG. 26A and FIG. 26B).

(8) According to at least one embodiment, the updating of the field-of-view image in the virtual space includes vibrating the virtual camera in the axial direction perpendicular to the plane in periods defined by the setting of the physical size of the user (time Ta corresponding to inseam size La and time Tb corresponding to inseam size Lb in FIG. 25).

(9) According to at least one embodiment of this disclosure, there is provided a method to be executed on a computer (computer 200) in order to provide a virtual space via a head-mounted device (HMD 120). Control to be executed on the computer 200 includes defining (Step S2120 of FIG. 21) a virtual space. The control further includes receiving setting of a physical size of a user of the head-mounted device (FIG. 19 and FIG. 22). The control further includes receiving (Step S2110 of FIG. 21) input of the user. The control further includes updating (Step S2120 of FIG. 21) a field-of-view image of the virtual space to be displayed on the head-mounted device in accordance with the input. The control further includes outputting (Step S2130 of FIG. 21) sound in the virtual space in accordance with the input. The sound to be output is adjusted in accordance with the setting of the physical size of the user (FIG. 15).

It is to be understood that each of the embodiments disclosed herein is merely an example in all aspects and in no way intended to limit this disclosure. The scope of this disclosure is defined by the appended claims and not by the above description, and it is intended that this disclosure encompasses all modifications made within the scope and spirit equivalent to those of the appended claims. This disclosure described in each of the embodiments and each of the modification examples is intended to be implemented independently or in combination to the maximum extent possible.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

The invention claimed is:

1. A method, comprising:
   defining a virtual space, wherein the virtual space comprises a virtual point of view;
   identifying information on a physical size of a user wearing a head-mounted device (HMD);
   identifying a field of view in the virtual space based on a detected motion of the HMD and a position of the virtual point of view;
   displaying, on the HMD, a field-of-view image that corresponds to the field of view;
   moving the virtual point of view based on an input from the user;
   updating the field-of-view image based on movement of the virtual point of view;
   identifying sound to be produced in the virtual space in accordance with movement of the virtual point of view;
   identifying a timing to output the sound based on the physical size of the user; and
   outputting the sound from the HMD in synchronization with the identified timing.

2. The method according to claim 1,
   wherein the identifying of the information on the physical size of the user comprises identifying information on an inseam length of the user, and
   wherein the identifying of the timing to output the sound comprises identifying the timing based on the inseam length.

3. The method according to claim 1, further comprising:
   detecting information for identifying a plurality of positions of a body of the user through use of a plurality of devices for detecting the plurality of positions, wherein each device of the plurality of devices is arranged at a predetermined location on the body of the user; and
   identifying the information on the physical size based on a positional relationship among each of the plurality of positions.

4. The method according to claim 3,
   wherein each of the plurality of devices comprises a hand-held device, and
   wherein the method further comprises:
   detecting information for identifying a distance between both hands of the user through use of the plurality of devices, which are held by a hand of the user, respectively; and
   moving the virtual point of view based on input to the hand-held device.

5. The method according to claim 3, wherein the plurality of devices comprises devices to be mounted on a leg of the user, respectively, and wherein the method further comprises detecting, by the devices mounted on the leg of the user, walking by the user to move the virtual point of view in synchronization with the detected walking.

6. The method according to claim 3,
   wherein the virtual space comprises a three-dimensional space defined by three axes,
   wherein the input comprises movement of the HMD, and
   wherein the method further comprises:
   moving the virtual point of view to a position in the virtual space that corresponds to the movement of the HMD;
   detecting, by the plurality of devices, the input;
   identifying a movement amount of the virtual point of view that corresponds to the input based on the physical size of the user; and
   moving the virtual point of view in accordance with the input on a first plane defined by two axes among the three axes defining the virtual space.

7. The method according to claim 6, further comprising:
   vibrating the virtual point of view on a second plane perpendicular to the first plane while moving the virtual point of view along the first plane; and
   determining a distance of vibration of the virtual point of view on the second plane based on the physical size of the user.

8. The method according to claim 7, further comprising:
   determining a period of vibrating the virtual point of view based on the physical size of the user; and
   vibrating the virtual point of view on the second plane based on the period while moving the virtual point of view on the first plane.

9. The method according to claim 1, wherein the input comprises movement of the HMD.

* * * * *

UNITED STATES PATENT AND TRADEMARK OFFICE
CERTIFICATE OF CORRECTION

PATENT NO. : 10,223,064 B2
APPLICATION NO. : 15/851229
DATED : March 5, 2019
INVENTOR(S) : Tomohisa Goi Page 1 of 1

It is certified that error appears in the above-identified patent and that said Letters Patent is hereby corrected as shown below:

On the Title Page

Item (54) Change "METHOD FOR PROVIDING VIRTUAL SPACE, PROGRAM AND APPARATUS THEREFOR" to -- METHOD FOR PROVIDING VIRTUAL SPACE AND SYSTEM FOR EXECUTING THE METHOD --

Signed and Sealed this
Thirtieth Day of April, 2019

Andrei Iancu
*Director of the United States Patent and Trademark Office*